(12) United States Patent
Burgess

(10) Patent No.: US 11,046,000 B1
(45) Date of Patent: Jun. 29, 2021

(54) MANUFACTURING BY CONSOLIDATION SYSTEMS AND METHODS

(71) Applicant: Steven P. Burgess, Shreveport, LA (US)

(72) Inventor: Steven P. Burgess, Shreveport, LA (US)

( * ) Notice: Subject to any disclaimer, the term of this patent is extended or adjusted under 35 U.S.C. 154(b) by 0 days.

(21) Appl. No.: 17/132,736

(22) Filed: Dec. 23, 2020

(51) Int. Cl.
| | |
|---|---|
| *B29C 64/245* | (2017.01) |
| *B29C 64/232* | (2017.01) |
| *B29C 64/236* | (2017.01) |
| *B29C 64/241* | (2017.01) |
| *B29C 64/141* | (2017.01) |
| *B33Y 30/00* | (2015.01) |
| *B22F 12/00* | (2021.01) |
| *B22F 12/33* | (2021.01) |
| *B22F 10/25* | (2021.01) |

(52) U.S. Cl.
CPC ............ *B29C 64/245* (2017.08); *B22F 10/25* (2021.01); *B22F 12/222* (2021.01); *B22F 12/224* (2021.01); *B22F 12/226* (2021.01); *B22F 12/33* (2021.01); *B29C 64/141* (2017.08); *B29C 64/232* (2017.08); *B29C 64/236* (2017.08); *B29C 64/241* (2017.08); *B33Y 30/00* (2014.12)

(58) Field of Classification Search
CPC .... B29C 64/218; B29C 64/224; B29C 64/329
See application file for complete search history.

(56) References Cited

U.S. PATENT DOCUMENTS

| | | | |
|---|---|---|---|
| 10,195,786 B1* | 2/2019 | Armijo | B29C 64/393 |
| 2006/0105102 A1* | 5/2006 | Hochsmann | B29C 41/36 |
| | | | 427/180 |
| 2018/0319098 A1* | 11/2018 | Armijo | B29C 64/153 |

* cited by examiner

*Primary Examiner* — Timothy Kennedy
(74) *Attorney, Agent, or Firm* — R. Keith Harrison

(57) ABSTRACT

A manufacturing by consolidation system suitable for fabricating a component may include a consolidating head movable in a tamping direction. The consolidating head may include at least one support member. A lower head may be carried by the at least one support member. The lower head may have at least one tamper. At least one material dispensing assembly may be carried by the at least one support member. The at least one material dispensing assembly may be configured to contain or support a supply of at least one consolidating material. At least one material support guide may be carried by the lower head in material-receiving relationship to the consolidating roll unit. The at least one material support guide may have a guide discharge end forwardly of the tamper along the tamping direction. A platform positioning assembly may be disposed generally beneath the consolidating head. A working platform may be carried by the platform positioning assembly. In some embodiments, the platform positioning assembly may be configured to impart multi-positional capability to the working platform.

20 Claims, 13 Drawing Sheets

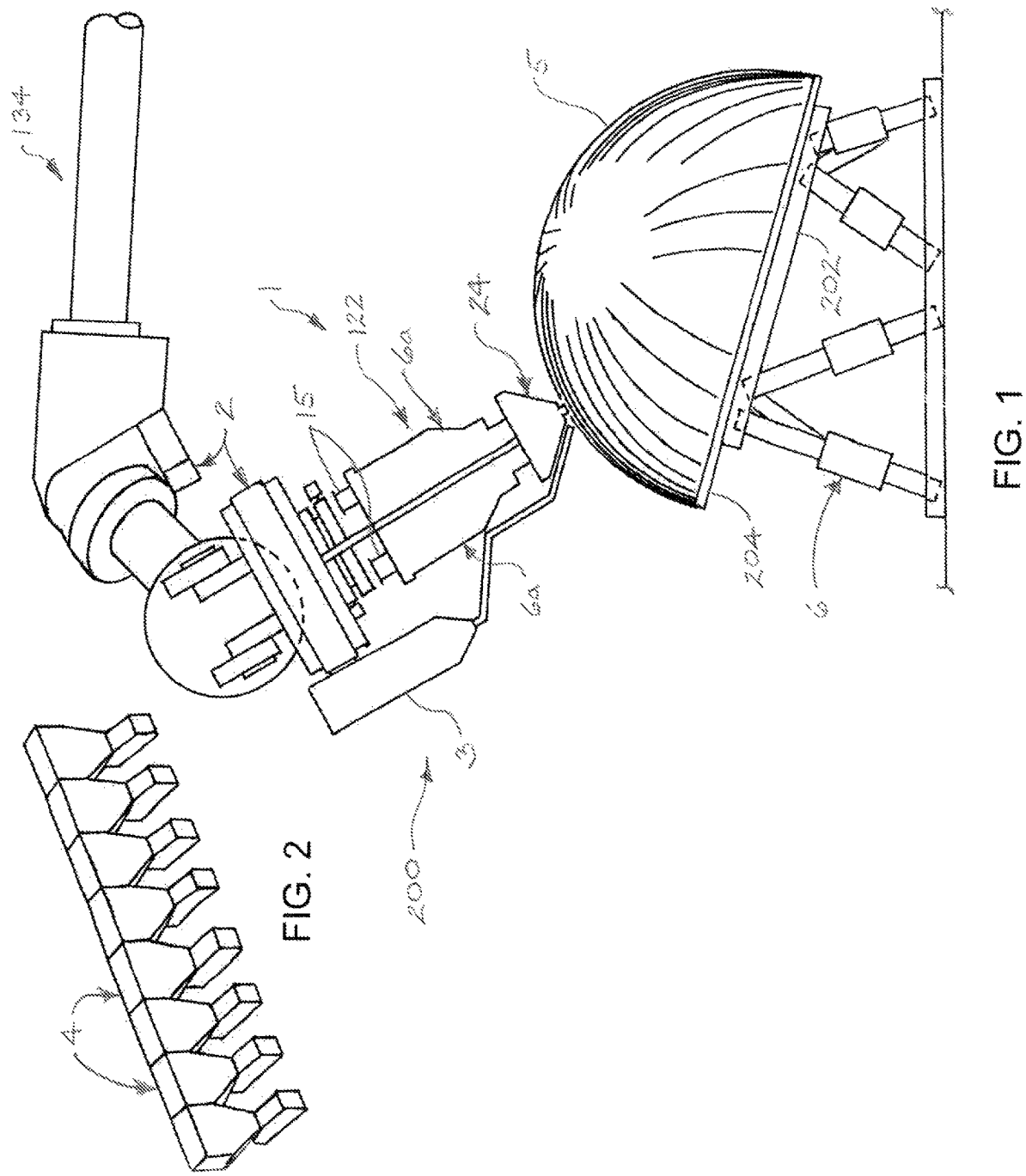

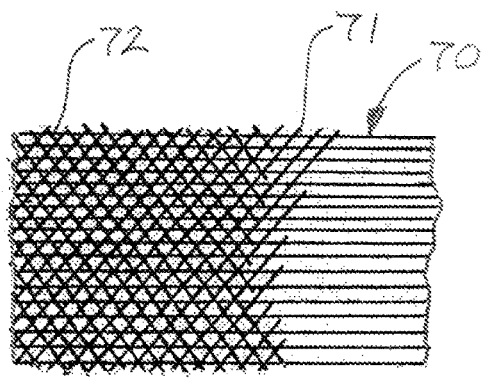
FIG. 7
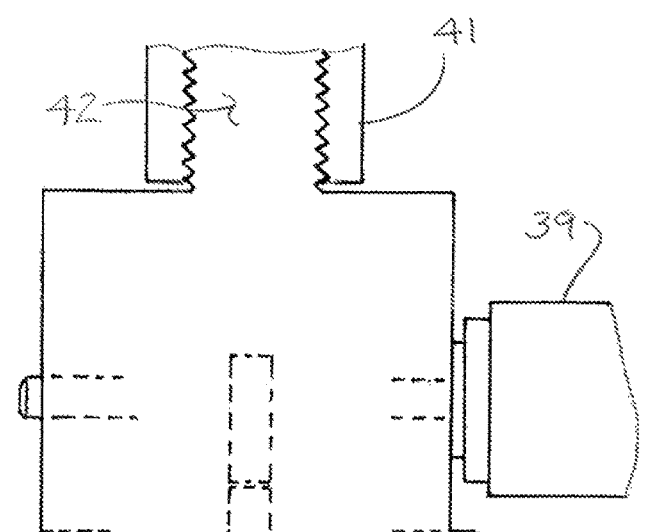
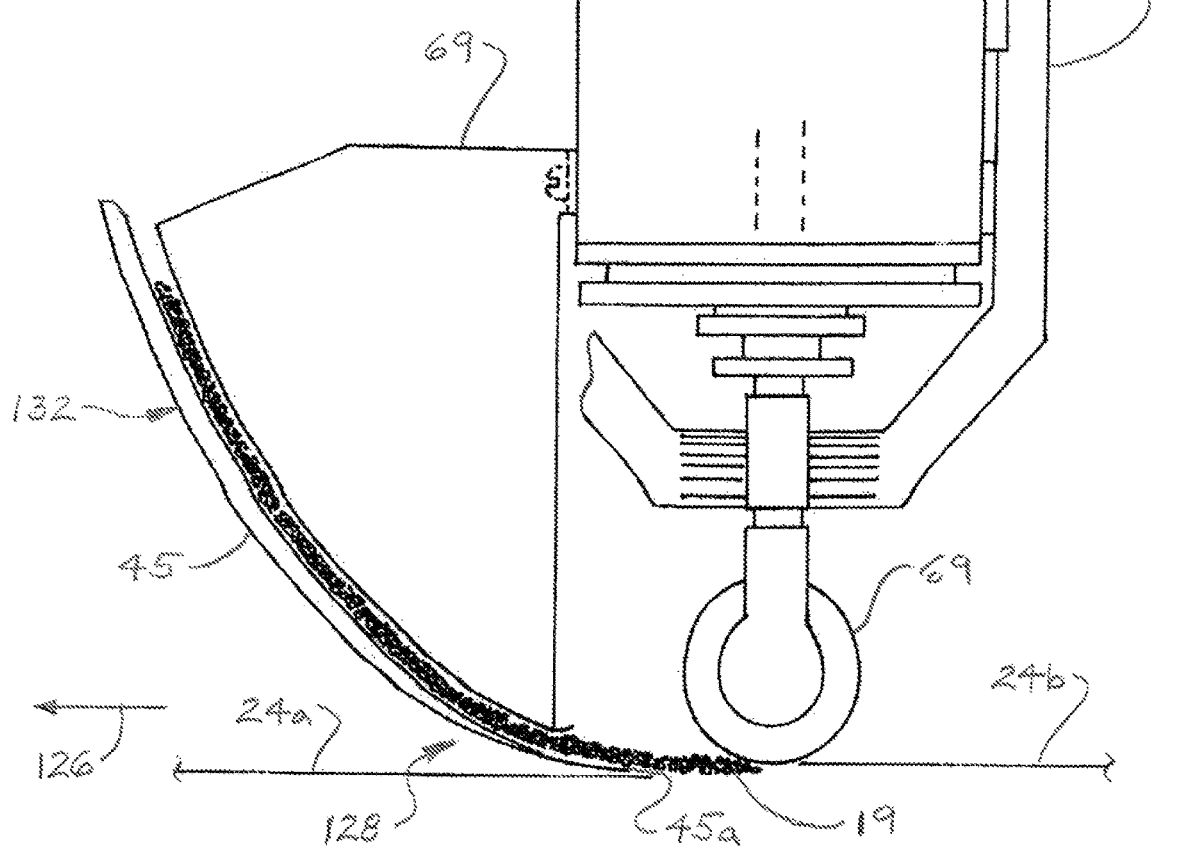
FIG. 6

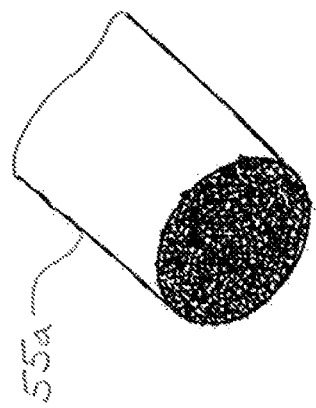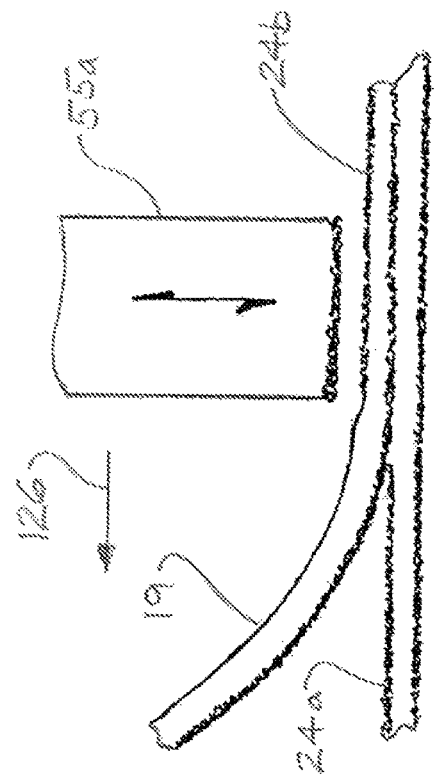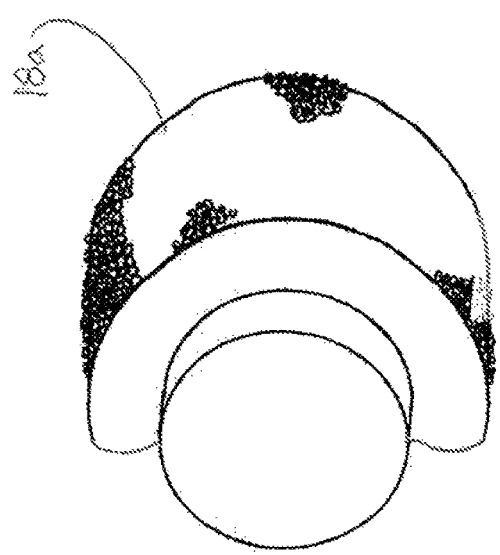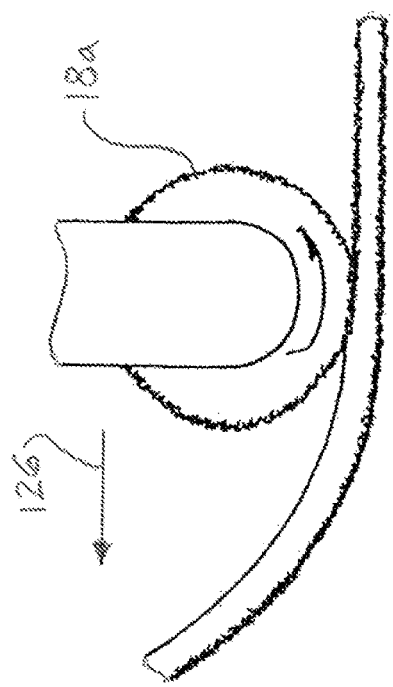

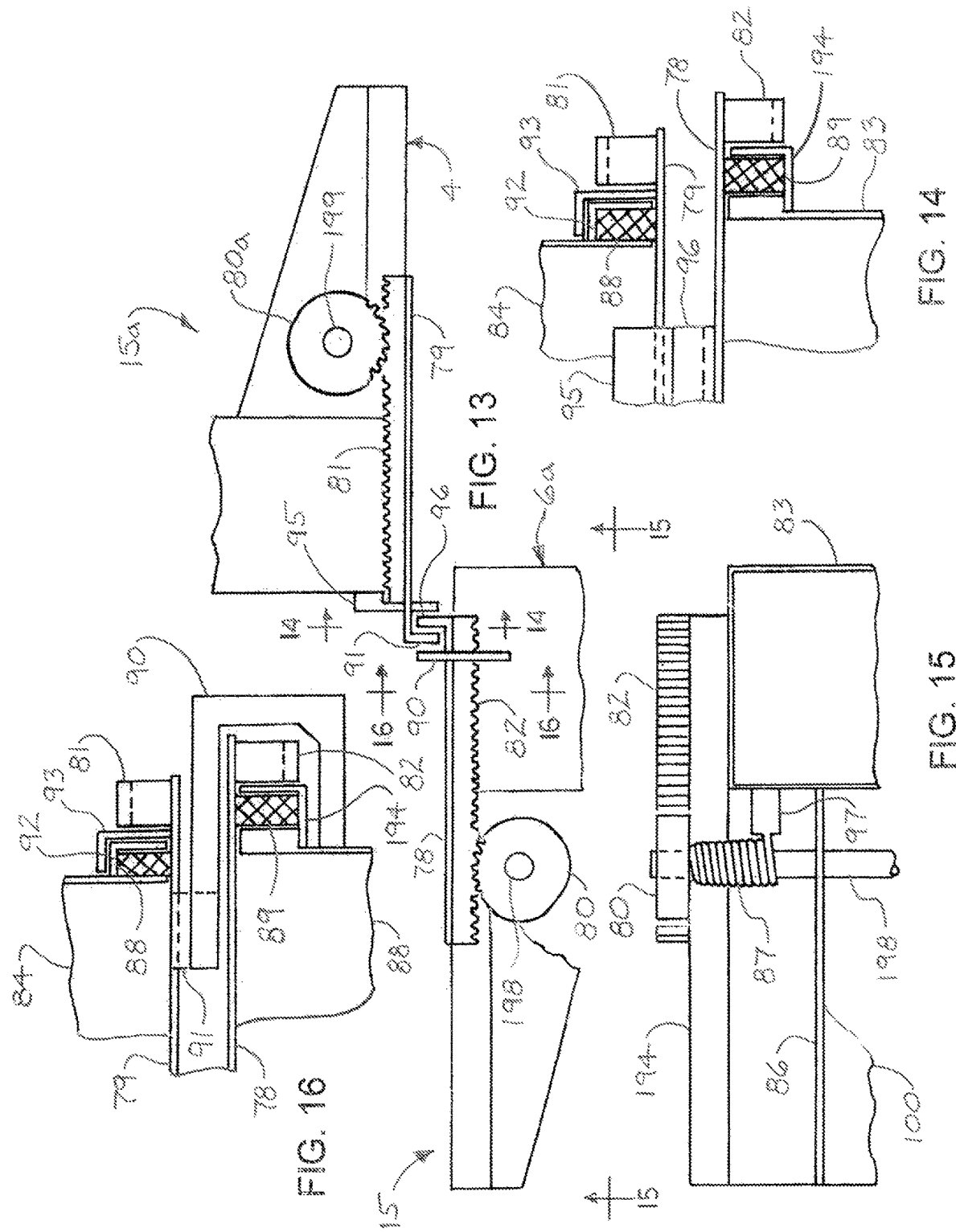

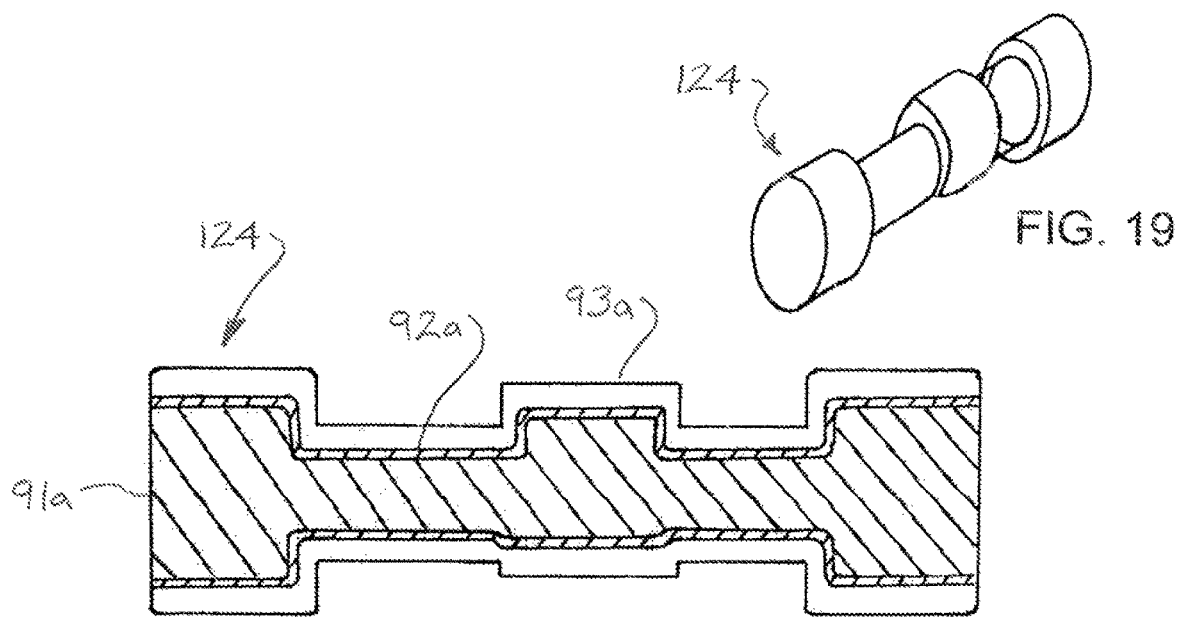
FIG. 19
FIG. 20
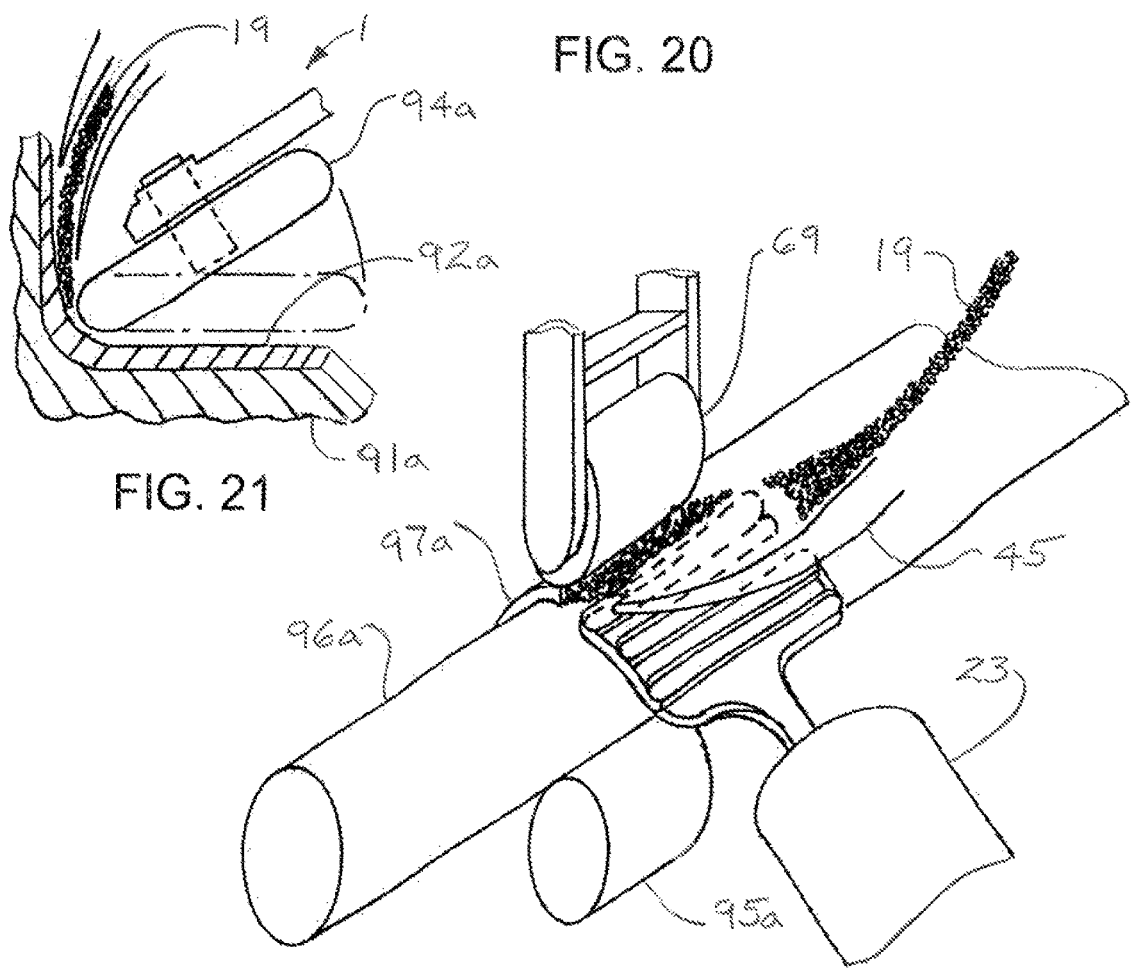
FIG. 21
FIG. 22

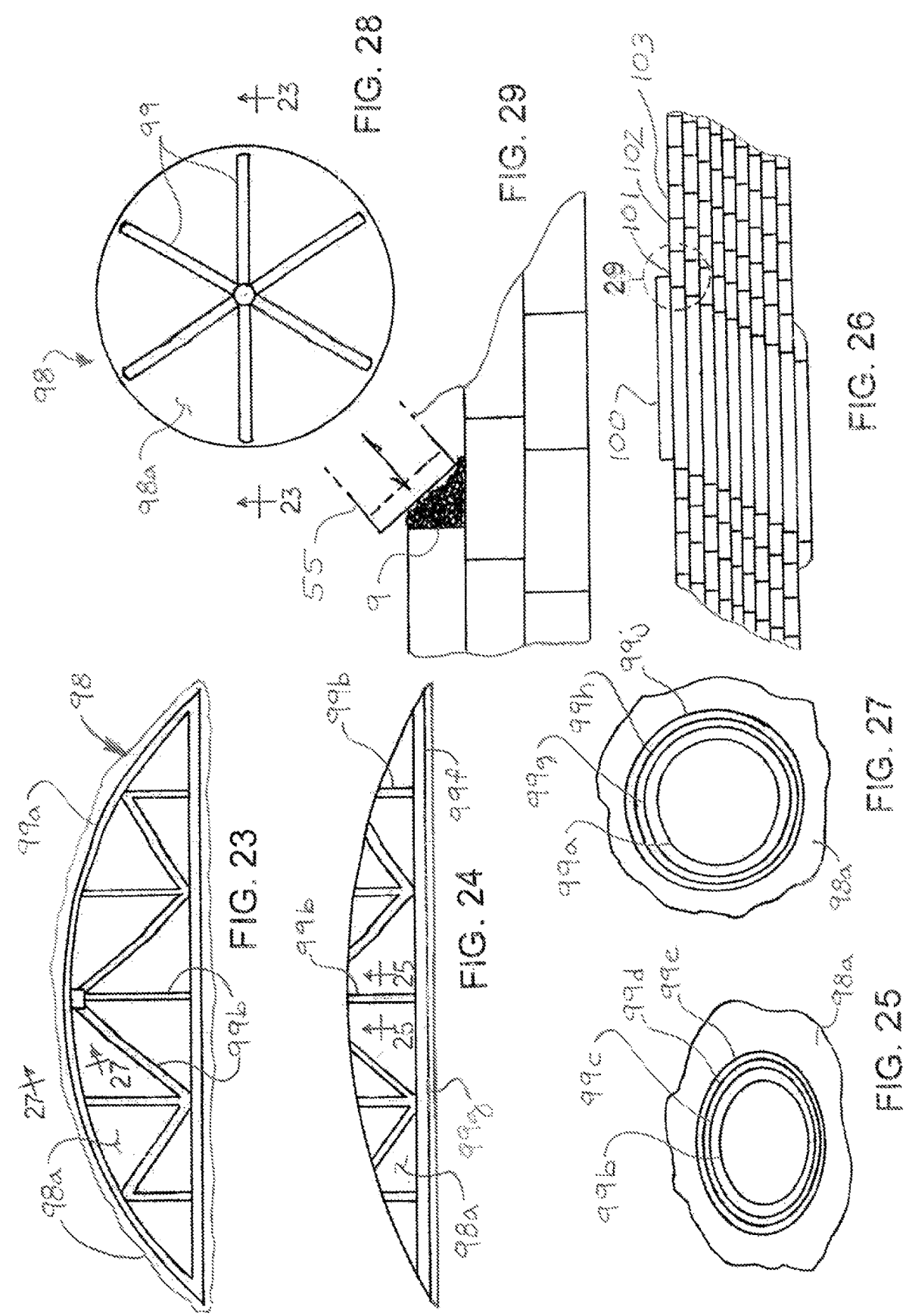

MANUFACTURING BY CONSOLIDATION SYSTEMS AND METHODS

FIELD

Illustrative embodiments of the MBC (Manufacturing By Consolidation) invention correlate to the general, relatively new layering manufacturing procedures of "Additive Manufacturing", or "AM", or "Advanced Manufacturing". A more recognizable field reference would be "3D Printing". While there are numerous versions of the existing process the concept is one of generating a part or component by the accumulation of thin layers, each representing a cross-section of the final component. Existing technology compiles layers mostly by the melting of powder or filament, and production is limited to horizontal plane application. Though individual layers are generated very thin, usually measured in microns the process moves rapidly. Most of the procedures produce smooth final surfaces over very intricate and complex shapes which need no post machining. Waste produced from subtractive machining is eliminated. Limitations of 3D Printing include the need for material melting, inability to combine materials—particularly metals, the selection of metals, the development of full material strength, and usually low production rates, particularly on large components. In addressing these limitations similarities between MBC and 3D Printing are only that products are generated by the accumulation of layers.

BACKGROUND

With the invention of machine tools in the early nineteenth century new designs of component parts of varying complexities began to develop. Subtractive manufacturing and metal castings proliferated throughout the nineteenth century. Machining production was restrained by the absence of hard cutting tools. There was considerable scrap in machining and casting and much labor in pattern making. These obstructions to manufacturing persisted well into the twentieth century.

Commercial interest in statues, sculptures, and other complex shapes evolved, and with existing two-dimensional drawings it was very difficult to communicate three-dimensional data to machinists. In 1864 Francois Willeme in U.S. Pat. No. 43822 illustrated a 3D photographic method from which dimensions could be obtained. From this concept the idea of product sections, or layers originated. Further in layering techniques 3D earth surface mapping evolved by the stacking of plates of surveyed dimensions at ascending elevations. The next significant technique was photo-topographic layering process by Morioka in 1935. In 1974 the idea of 3D Printing was laid out by David E. H. Jones, a scientific writer and an author of plausible schemes and inventions. His ideas were published in the English journal New Scientist. The early 1980's experienced considerable development toward 3D Printing by Hideo Kodama and Bill Masters, the latter who filed the first 3D Printing patent. In 1986 Chuck Hull with U.S. Pat. No. 4,575,330 patented a stereolithography process of 3D Printing. This became known as "rapid prototyping", or the building up of a product by the accumulation of successive thin layers of a solidifiable material, with the configuration developed by CNC/CAD technology.

Since then, many variations of the layering process, referred to as additive manufacturing or 3D Printing have evolved, aided by advancing computer software. Some tabulated procedures follow as:

1. Fused Deposition Modeling, FDM: A horizontal process of component building by layering through the melting of a continuous stream of plastic filament.
2. Laminated Object Manufacturing, LOM: Plastic or metal foil is automatically stacked and glued together horizontally, by layers, cut by lasers to form a designated shape.
3. Solid Ground Curing, SGC: A photopolymer-based layering system for prototypes and modeling wherein each layer is generated by means of a powerful UV lamp through a mask.
4. Stereolithography, SLA: A 3D Printing process where UV light is focused on a vat of liquid resin which causes a thin layer of the resin to harden in a specific two-dimensional configuration. Successive layers are added in a shape of a cross-section of the objective part until the complete 3D part is finished. It is generated by CNC controls.
5. 3 D Printing: Evolved technical term for aggregate methods of additive manufacturing of components by the systematic layer by layer buildup of powder rendered solid by laser welding or by adhesive joining.
6. Selective Laser Sintering, SLS: Horizontal layering process with plastic powder sintered in place, versus melted, in a selected shape by laser.
7. Selective Laser Melting, SLM: As SLS but for powder being melted versus sintered.
8. Multi Jet Fusion, MJF: Distribution of nylon powder across a horizontal bed which is selectively covered by an inkjet army with detailing and fusing agents. Afterward the powder is solidified by heating elements and the process repeats until a component form is completed.
9. Ballistic Particle Manufacturing. BPM: Molten plastic is fed into a piezoelectric jetting mechanism which shoots tiny droplets of the plastic onto a target objective component, freezing upon contact. CNC controls dictate the component configuration. Jetting continues until the desired configuration is finished.
10. Directed Light Fabrication, DLF: Plastic or metal powder particles are carried by pressurized gas into a laser beam positioned by CNC. Particles are melted into a specified shape which is built up layer by layer.
11. Direct Shell Production Casting. DSPC: 3D Printing method for producing casting molds for metals from ceramics. A liquid carrier is dropped onto ceramic powder in a layer by layer buildup process CNC controlled. Upon shape completion the mold is fired and ready for use.
12. Shape Deposition Manufacturing, SDM: A layering process. CNC controlled in which a compatible support material is laid upon a platform to which metal is deposited as near net shape as possible to the specific layer. Metal or plastic is deposited by thermal spray, welding, or micro casting. Special inserts or sensors may be embedded in the building process. Any of the variety of machining techniques final shapes the layer of deposited material, and the process is repeated until the part is finished.
13. Binder Jetting: This process builds parts by layering without melting powder by lasers. A bed of plastic, metal, or other powder is spread on a horizontal table. A CNC controlled ink jet type feeder drops liquid adhesive in strategic areas to create the section required of the part. This is repeated until the part is finished and adhesive is disposed of by heating. Other versions drop a mixture of powder and adhesive onto the platform in the shape dictated by the section, again repeating the process to the finished part.
14. Direct Metal Laser Sintering, DMS: Metal powder is thin layer spread over a horizontal table surface. Overhead lasers sinter the powder in shapes designated by CNC at the specific part section. This is repeated to the finished part.

15. Directed Energy Deposition, DED: This is a layering welding process uninterrupted by repeated repositioning. A deposition head contains a directed heating source, electron beam or laser into which powder or wire is fed at the point of joining to the objective part.

The part is built up by the accumulation of weld deposited.

16. Metal Extrusion additive manufacturing, similar to FDM: Layer by layer a composition of a metal and plastic filament is extruded through a heated nozzle to melt the plastic where it is laid on preceding layers accumulating to a final part. The part is post heated to remove the plastic and sinter the metal for bonding.

These procedures collectively demonstrate both innovative and limiting characteristics. None demonstrate the aggregate of desired properties, including full density over a wide array of metals and metal combinations. Ability to operate in infinite planes throughout an upper hemispherical envelope, production without melting, sufficient operating speed, capabilities of repair and enhancement to existing parts, wide range of metal applications, availability in a wide array of mounting concepts, and availability to large and small shops are unavailable process features.

During the last few decades there has been an increasing demand for weight reduction in aerospace vehicles, particularly helicopters. There are numerous applications for which magnesium and aluminum are insufficient in strength and heat resistance. Titanium alloys are the only metals with sufficient strength exhibiting significant weight reductions over steel. However, titanium does not meet the necessary stiffness requirements and has galling limitations.

Studies in methods to reduce weight in both aerospace and racing industries has resulted in the need to combine alloys of metals such as nickel, steel, and titanium, along with alloys containing high percentages of hard ceramic material for abrasion resistance.

Weight reduction in transport vehicles presents an opportunity for fuel savings and other benefits. The racing industry has long experimented with lighter weight, more wear resistant engine valve train components, though with little success.

Heavy industry has researched since infancy improvements in wear, erosion, and corrosion for cutting edges, mixing and blending tools, rolls, pumps and valves, piping, chemical process equipment, ship propellers, metal forming tools, plastic molds, and food processing machinery.

Observations of these limitations and needs over decades of experience have led to remedies embodied and illustrated herein. Embodiments operate from the principle of placing material directly where required, in the quantity needed, with the most optimum available properties for the application, at minimal cost. To achieve this, welding or melting temperatures must be avoided. For applications where steel, nickel, and other metals must blend with titanium alloys, provisions must be made to prevent intermetallic embrittlement, undesirable alloy phase changes, and oxides formation. Where titanium alloys require enhanced rigidity interior steel structures must be generated within, complete with generous material joining gradients and the prevention of steel-to-titanium contact. Where chemical processing equipment is exposed to extreme corrosion the equipment must be protected with applicable material, such as tantalum, metallurgically fused, fully dense, and again with appropriate material gradients.

These example remedies and others to address the needs and limitations noted in the discussions preceding, including equipment available to large and small shops are herein illustrated and described.

SUMMARY

Illustrative embodiments of the disclosure are generally directed to a manufacturing by consolidation system suitable for fabricating a component. An illustrative embodiment of the manufacturing by consolidation system may include a consolidating head movable in a tamping direction. The consolidating head may include at least one support member. A lower head may be carried by the at least one support member. The lower head may have at least one tamper. At least one material dispensing assembly may be carried by the at least one support member. The at least one material dispensing assembly may be configured to contain or support a supply of at least one consolidating material. At least one material support guide may be carried by the lower head in material-receiving relationship to the consolidating roll unit. The at least one material support guide may have a guide discharge end forwardly of the tamper along the tamping direction. A platform positioning assembly may be disposed generally beneath the consolidating head. A working platform may be carried by the platform positioning assembly. In some embodiments, the platform positioning assembly may be configured to impart multi-positional capability to the working platform.

BRIEF DESCRIPTION OF THE DRAWINGS

Illustrative embodiments of the disclosure are described as follows, complete with examples and referencing numbers.

FIG. 1 is a perspective view of an illustrative embodiment of the MBC system;

FIG. 2 is a perspective view of a set of storage hoppers which contain the various powdered or particulate consolidating material which are to be dispensed by the consolidating head of the MPC system;

FIG. 6 is an elevation view of the lower head, more particularly illustrating a roller-type oscillating tamper on the lower head;

FIG. 7 is a plane illustration of an example of the capability of the MBC system to fabricate a component by changing the travel path or tamping direction of the consolidating head in order to effect a more isotropic and dense material microstructure in the component, with each line representing a tamped material;

FIG. 9 is a partially sectioned elevation view of one of two powder consolidation rolls having a textured powder contacting surface;

FIG. 10 is a sectioned perspective view of a textured bottom or powder contacting surface of the oscillating tamper;

FIG. 11 is a partially sectioned elevation view of the roller options for the oscillating tamper with a textured powder contacting surface and its effect on the incoming semisolid material stream;

FIG. 12 is an elevation view of the oscillating tamper illustrated in FIG. 10, showing the textured effect in operation on the incoming semisolid material stream;

FIG. 13 is a side elevation view illustrating a typical automatic loading gate method for a storage hopper and a material dispensing hopper of the MBC system;

FIG. 14 is a half-sectioned side elevation view of the contact initiation of the opening of the loading gates on the material dispensing hopper and the storage hopper for reloading of the material dispensing hopper;

FIG. 15 is a plan view of the loading gates illustrated in FIG. 13, more particularly illustrating a typical opening and closing mechanism for the gates;

FIG. 16 is a top view of the loading gates in a different position from that as illustrated in FIG. 14;

FIG. 19 is an isometric view of a typical single lobe camshaft which serves as an example of a component which can be fabricated using the MBC system;

FIG. 20 is a longitudinal sectional view of the camshaft illustrated in FIG. 19, illustrating an inner core of a titanium alloy, an inner layer of a first metal on the inner core and an outer layer of a second metal on the inner layer;

FIG. 21 is a sectional view which illustrates a method of rolling or roll forging the semisolid material stream to inside corners of the camshaft to form the inner and outer layers shown in FIG. 20 by operation of the consolidating head, with the flux metering pump and stream heater of the consolidating head included but not shown;

FIG. 22 is an isometric view illustrating the layering process illustrating application of the roller oscillating tamper of the MBC system on a cylindrical workpiece;

FIG. 23 is a sectional view, taken along section lines 23-23 in FIG. 28, of a typical hub fabricated using the MBC system, more particularly illustrating internal stiffening trusses of the hub;

FIG. 24 is a sectional view of the hub with the trusses illustrated in FIG. 23, in an unfinished state;

FIG. 25 is a sectional view, taken along section lines 25-25 in FIG. 24, of a structural truss member, illustrating multiple metal layers forming a metallurgical gradient between the structural truss member and the solid hub body of the hub;

FIG. 26 is a sectioned elevation view of a structural truss member in the hub, illustrating a gradient of metal layers between the structural truss member and the solid hub body of the hub in fabricating the metallurgical gradient;

FIG. 27 is a sectional view of the top structural truss member in the hub, illustrating the plurality of metal layers forming a metallurgical gradient between the structural truss member and the solid hub body;

FIG. 28 is a plan view of a hypothetical hub being fabricated using the MBC system;

FIG. 29 is an enlarged sectional view, taken along section line 29 in FIG. 26, of the gradient of metal layers in the structural truss member of the hub, more particularly illustrating tamping of the consolidating material by operation of the oscillating tamper in initiating a gradient metal layer on the truss;

DETAILED DESCRIPTION

Figure 3:
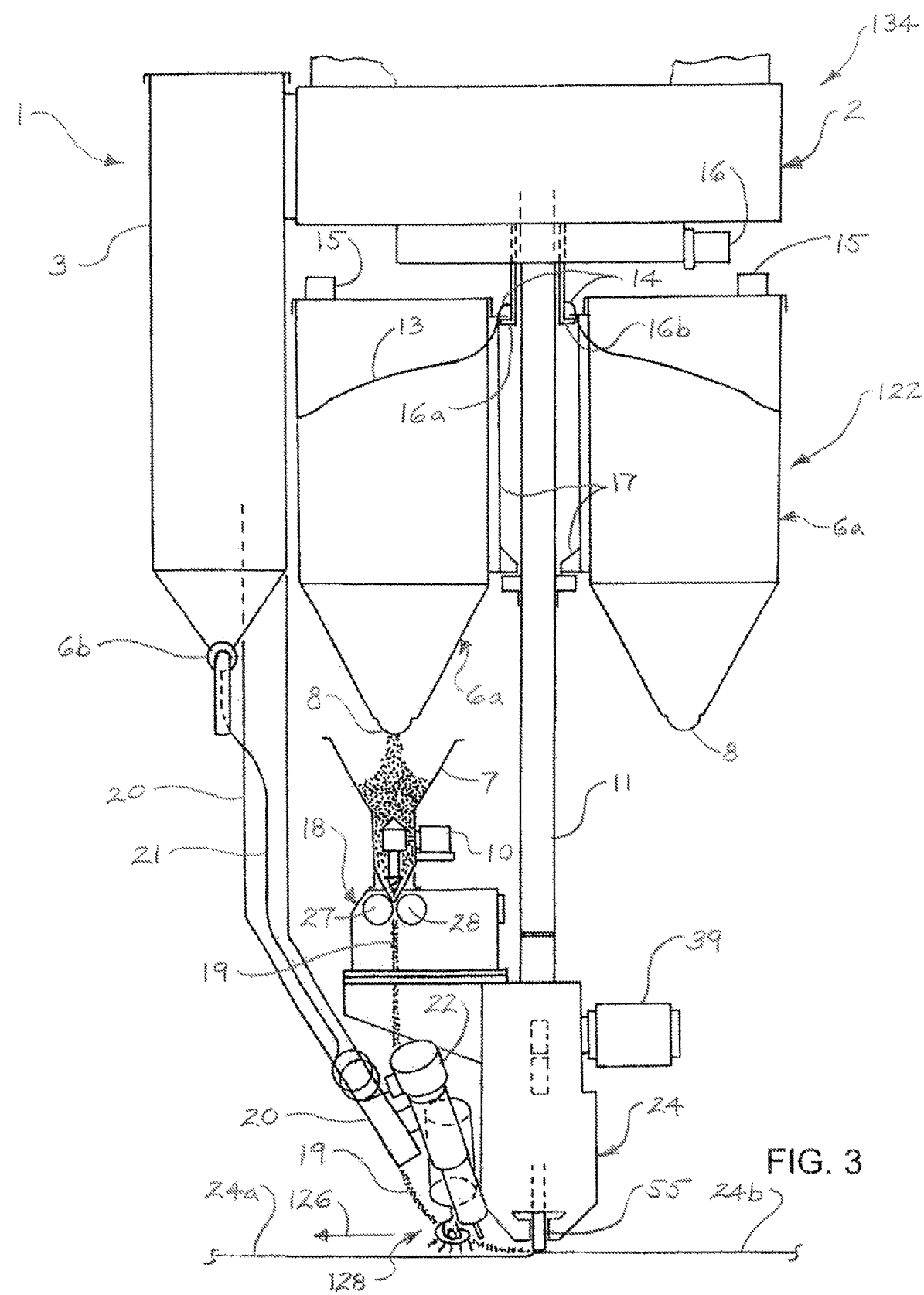
FIG. 3 is an elevation schematic view of a typical consolidating head of the MBC system in an upright, vertical position, forming and tamping a semisolid material stream on a substrate in typical operation of the MBC system.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description. As used herein, relative terms such as "upper" and "lower" are intended to be used in an illustrative and not a limiting sense. In some applications, therefore, those elements which are identified as "upper" may be located beneath those elements which are identified as "lower" in the following detailed description.

The following discussion and referenced illustrative embodiments describe components and a system and method of thin layer accumulation Manufacturing By Consolidation (MBC), versatile and comprehensive in nature.

Objectives of MBC include but are not limited to production of mechanical, structural, and other functional components optimum in material and morphological design for addressing operational environments.

Applications for MBC may include a variety of component configurations such as inside/outside corners, rolls, bends, points, wells, valleys and inside diameters of manufactured parts. Interchangeable tooling can be utilized to address a host of operational applications. The base MBC structure may be designed to adapt readily to the alterations required to address most applications, many aided by independent workpiece positioners.

The versatility of MBC would require impractical voluminous illustrations and discussion to thoroughly represent. The primary focus of the representation herein is layer bonding by forge welding, anticipating that to be the most immediate industry need. The other methods of bonding, adhesion and interlocking may be similar and utilize the same major components and will therefore be addressed to a lesser extent.

Referring initially to FIGS. 1-7 of the drawings, an illustrative embodiment of the MBC system of the disclosure is generally indicated by reference numeral 200. As illustrated in FIG. 1, the MBC system 200 may include at least one consolidating head support 134. At least one consolidating head 1 may be supported by the consolidating head support 134. The consolidating head support 134 may be configured to move the consolidating head 1 in a tamping direction 126. In some embodiments, the consolidating head support 134 of the MBC system 200 may have a bench model configuration in which movement of the consolidating head 1 is manually actuated. In other embodiments, the consolidating head support 134 may be robotic and programmable. In still other embodiments, the consolidating head support 134 may be mounted on a beam arm fitted with handles for manual movement. In still other embodiments, the consolidating head support 134 may facilitate multi-positional movement of the consolidating head 1 using a control panel with joysticks and/or other control elements, according to the knowledge of those skilled in the art.

As illustrated in FIGS. 1 and 2, in some embodiments, the consolidating head support 134 may include at least one multi-positional robot head 2. The robot head 2 may be a component part of a complete robot (not shown). The consolidating head 1 may be supported by the robot head 2 for selective multi-positioning along the x, y and z axes and a rotational axis. The robot head 2 may be configured to move the consolidating head 1 in the tamping direction 126, as illustrated in FIGS. 3 and 5-8.

The consolidating head 1 may include at least one material dispensing assembly 122. In some embodiments, the material dispensing assembly 122 may include at least one, and typically, a plurality of material dispensing hoppers 6a, the purpose of which will be hereinafter described.

A platform positioning assembly 6 may be positioned generally beneath the consolidating head 1. The platform positioning assembly 6 may be a parallel manipulator such as a Stewart platform having multiple, typically six, prismatic actuators such as hydraulic jacks or electric linear actuators. A working platform 202 may be supported on the platform positioning assembly 6. The working platform 202 may be suitably sized and configured to support a receiving base 204 on which the component or part will be fabricated by consolidation. The platform positioning assembly 6 may be suitably configured and designed to tilt or orient the working platform 202 and the receiving base 204 thereon along x, y and z axes. The multi-positioning movement capability of the consolidating head 1 implemented by the robot head 2, combined with the multi-positioning capability of the platform positioning assembly 6, as the robot head 2 moves the consolidating head 1 in the tamping direction 126 may define a hemispherical dimensional envelope 5. The hemispherical dimensional envelope 5 may define the working volumetric parameters within which the MBC system 100 is operable to fabricate the desired component or part by consolidation, typically via cooperative actuation of the platform positioning assembly 6 and the consolidating head 1 by operation of the robot head 2. Accordingly, the robot head 2 may be operable to position the consolidating head 1 along a continuum of points within the space or volume of the hemispherical dimensional envelope 5 to define the trajectory of the tamping direction 126 for fabrication of the component or part in the required shapes and geometries.

As illustrated in FIG. 2, a set of remote storage hoppers 4 may be provided in accessible proximity to the consolidating head 1. Each of the remote storage hoppers 4 may be configured to hold or contain at least one powdered consolidating material 9 (FIG. 3) which will be used in consolidation of the component or part on the receiving base 204 and within the parameters defined by the volume or space of the hemispherical dimensional envelope 5. The robot head 2 may be operable to position one or more of the material dispensing hoppers 6a of the consolidating head 1 into alignment or registry with one or more of the storage hoppers 4 for transfer of powdered consolidating material 9 from one or more of the storage hoppers 4 to the material-dispensing hopper or hoppers 6a. As illustrated in FIG. 3, a hopper valve 8 may be provided at the funneled or conical bottom of each material-dispensing hopper 6a. In some embodiments, at least one loading gate 15 may be provided on each material-dispensing hopper 6a for automated operation.

As will be hereinafter further described, the consolidating head 1 may be configured to receive one or more of the selected powdered consolidating materials 9 from the material-dispensing hopper 6a, consolidate the powdered consolidating material 9 to a semisolid material stream 19 (FIG. 3) by cold forming and heating the semisolid material stream 19 and the receiving base 204, and bond the semisolid material stream 19 initially in a first layer to a substrate 24a (FIG. 3) on the receiving base 204 and then in subsequently successive layers to the first layer and each previously-formed successive layer by forge welding, typically by actuation of at least one reciprocating or oscillating tamper 55 (FIG. 3) or alternatively, by a pressure rolling action via at least one tamper roll 69 (FIG. 6) as the consolidating head 1 moves in the tamping direction 126. As used herein, "tamper" includes but is not limited to any mechanical device or member or combination thereof, whether actuated in an oscillating, rolling and/or other motion, which is suitable for compressing the consolidating material stream 19 to form the layers on the substrate 24a in fabrication of the component or part. In an automated mode, the robot head 2 may be programmed to position the material dispensing hoppers 6a into alignment or registry with one or more of the remote storage hoppers 4 (FIG. 2) to receive a refill of one or more of the powdered consolidating materials 9.

As illustrated in FIG. 3, in some embodiments, the consolidating head 1 may include at least one support member 11 such as a rod or shaft, for example, and without limitation, which may extend from the robot head 2. A lower head 24 may be provided at the lower end of the support member 11. The lower head 24 may be configured to tamp or roll the semisolid material stream 19 to form the manufactured part on the receiving base 204 (FIG. 1) of the working platform 202, as will be hereinafter described. At least one, and typically, a plurality of the material dispensing hoppers 6a may be supported by the support member 11 according to the knowledge of those skilled in the art. In some embodiments, a rotating bearing 12 and a rotating tubular shaft 16a may rotatably mount the material dispensing hoppers 6a to the support member 11. Shaft flanges 16b may extend from the tubular shaft 16a. The material dispensing hoppers 6a may be releasably mounted to the shaft flanges 16b typically via disconnect handles 13 and toggle latches 14. Bottom hopper flanges 17 may extend from the respective material dispensing hoppers 6a. The bottom hopper flanges 17 may normally engage or rest on the rotating bearing 12.

A rotating ring bearing or slewing bearing 16 may be mounted underneath or internal to the robot head 2. The slewing bearing 16 may be drivingly engaged for rotation by a hopper rotation motor (not illustrated) according to the knowledge of those skilled in the art. The slewing bearing 16 may drivingly engage the rotatable tubular shaft 16a for rotation. Accordingly, by operation of the hopper rotation motor, the material dispensing hoppers 6a may rotate about the longitudinal axis of the support member 11 via the slewing bearing 16 and the tubular shaft 6a. In some embodiments, the material dispensing hoppers 6a may be quickly disconnected from respective shaft flanges 16b on the tubular shaft 16a typically by depressing the disconnect handles 13 and releasing the toggle latches 14 from the shaft flanges 16b and lifting the material dispensing hoppers 6a vertically and outwardly from the non-locking bottom hopper flanges 17 which engage the rotating bearing 12.

As further illustrated in FIG. 3, a feed hopper 7 may be disposed beneath and in alignment or registration with the hopper valve 8 on the material dispensing hopper 6a from which the consolidating material 9 is to be dispensed. A tapered hopper auger 10 may be disposed concentrically inside the feed hopper 7. An auger drive motor (not illustrated) may drivingly engage the hopper auger 10 for rotation in the feed hopper 7. Accordingly, the consolidating material 9 may be dispensed from the material dispensing hopper 6a through its hopper valve 8 and into the feed hopper 7 as the hopper auger 10 rotates and breaks up the consolidating material 9 and forces the consolidating material 9 into and through an underlying consolidating roll unit 18.

The consolidating roll unit 18 may be disposed beneath the feed hopper 7. In some embodiments, the consolidating roll unit 18 may be securely bolted to the lower head 24. The consolidating roll unit 18 may be suitably configured and positioned to receive the consolidating material 9 from the feed hopper 7 and compress and consolidate the consolidating material 9 into the semisolid material stream 19 as the consolidating material 19 exits the feed hopper 7.

Figure 5:
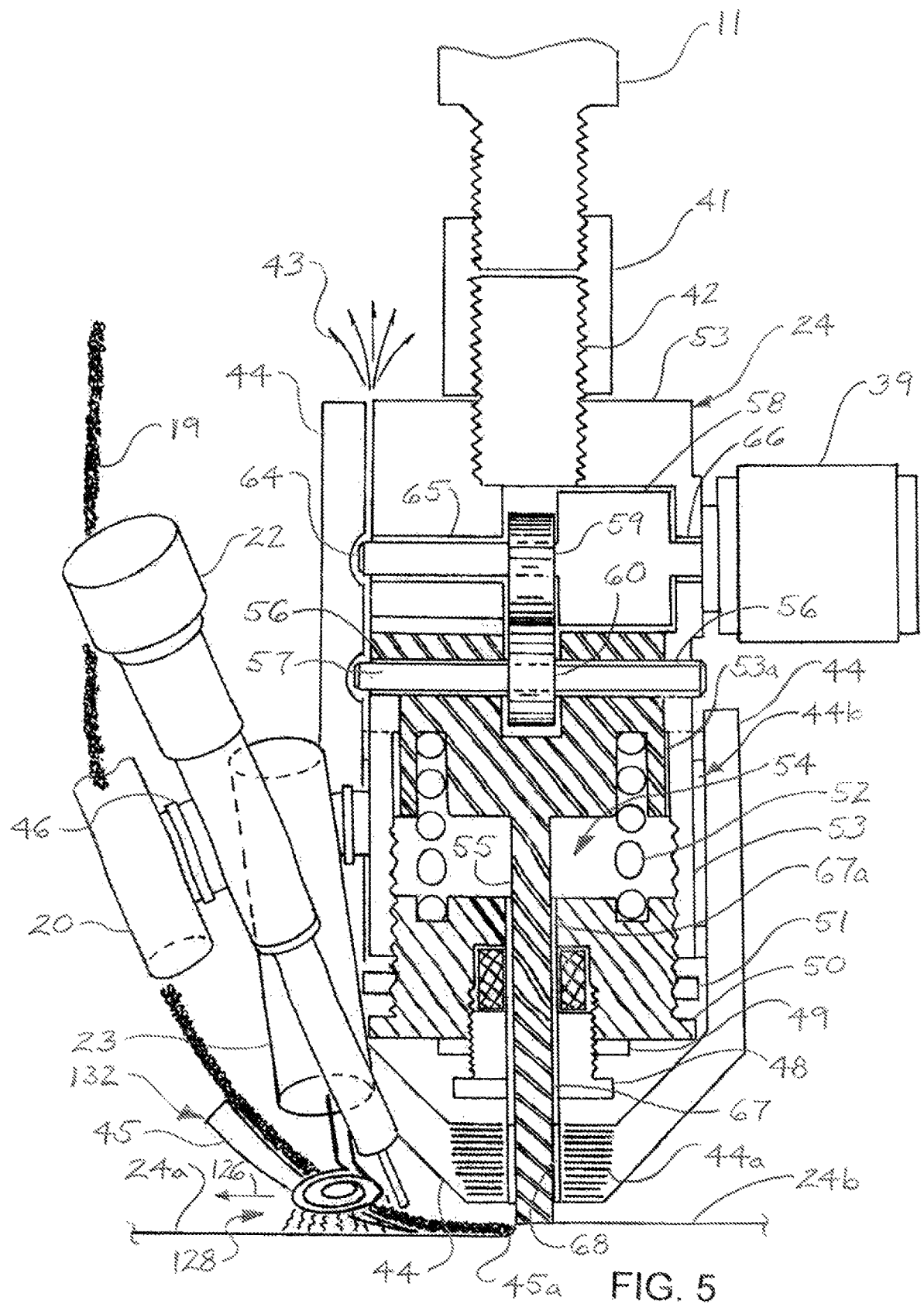
FIG. 5 is a partially sectioned elevation view of the lower head of the consolidating head, illustrating an oscillating tamper and a typical oscillating mechanism suitable for facilitating oscillation of the oscillating tamper in the lower head, with the semisolid material stream being fed to the oscillating tamper, and a flux metering pump and a stream heater disposed in proximity to the oscillating tamper for preparation of the semisolid material stream to the tamp zone ahead of the oscillating tamper.

As illustrated in FIG. 5, at least one material support guide 132 may be provided on the lower head 24 in material-receiving relationship to the consolidating roll unit 18. In some embodiments, the material support guide 132 may include at least one stream support ramp 45 which may be supported by the lower head 24. In some embodiments, the stream support ramp 45 may have a ramp discharge end 45a which terminates forwardly of the oscillating tamper 55 in the tamping direction 126. Accordingly, the stream support ramp 45 may be configured to guide and discharge the semisolid material stream 19 to a tamp zone 128 which lies is just ahead of the lower head 24 preparatory to tamping or rolling of the semisolid material stream 19 by operation of the lower head 24 to form the manufactured part.

Figure 4:
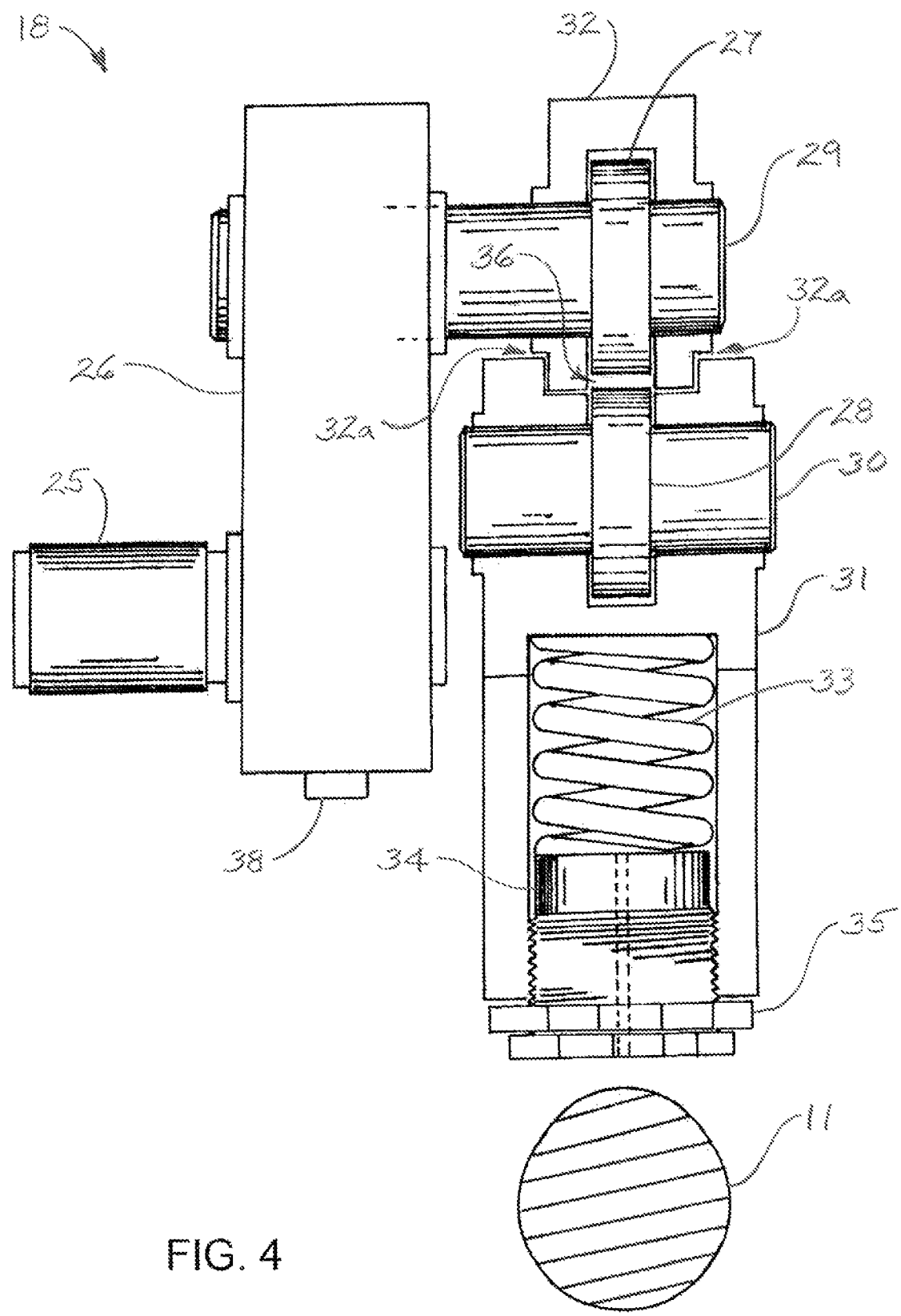
FIG. 4 is a top view of a typical consolidating roll unit of the consolidating head, with a top plate of the consolidating roll unit removed to expose interior components.

As illustrated in FIG. 4, the consolidating roll unit 18 may include a roll motor 25. A speed reducer gear unit 26 may be drivingly engaged by the roll motor 25. A first consolidating roll 27 may be drivingly engaged for rotation in a first consolidating roll housing 32 by the speed reducer gear unit 26 through a first roll shaft 29. A second consolidating roll 28, disposed on a second roll shaft 30, may be drivingly engaged for rotation in a second consolidating roll housing 31 by the first consolidating roll 27. In some embodiments, the first consolidating roll 27 and the second consolidating roll 28 may be integral to the first roll shaft 29 and the second roll shaft 30, respectively. The first consolidating roll 27 and the second consolidating roll 28 may rotate in sleeve bearings (not illustrated) mounted in the respective first consolidating roll housing 32 and second consolidating roll housing 31.

A roll gap 36 may be disposed between the first consolidating roll 27 and the second consolidating roll 28. The roll gap 36 may be adjustable in width to accommodate the different types of consolidating materials 9 (FIG. 3) which may be used to form the semisolid material stream 19 as well as to set the desired MBC production rate. In some embodiments, the width of the roll gap 36 may be adjustable such as by rotating adjusting screws (not illustrated) or by using insertable and removable shims (neither shown), for example and without limitation.

At least one housing joint 32a may be disposed between the first consolidating roll housing 31 and the second consolidating roll housing 32. The housing joints 32a may enable the first consolidating roll housing 31 and the second consolidating roll housing 32 to slide with respect to each other. In some applications, shims (not illustrated) may be inserted in the housing joints 32a to adjust the sliding action.

At least one housing spring 33 may be configured to clamp the first consolidating roll housing 31 against the second consolidating roll housing 32 and may act as a gap-opening relief in the event of a roll jamb-up. A threaded adjustment plug 34 may be disposed in the first consolidating roll housing 31 in engagement with the housing spring 33. The adjustment plug 34 may facilitate adjustment of the spring force exerted by the housing spring 33. A threaded locking nut 35 may maintain the position of the adjustment plug 34.

As further illustrated in FIG. 3, the semisolid material stream 19 may be formed as the consolidating material 9 is discharged from the material dispensing hopper 6a through the hopper valve 8 and into and through the feed hopper 7. The hopper auger 10 may rotate in the feed hopper 7 to break up and enable the consolidating material 9 to fall between the underlying first consolidating roll 27 and the second consolidating roll 28 (FIG. 4) of the consolidating roll unit 18 and force the consolidating material 9 through the roll gap 36 between the first consolidating roll 27 and the second consolidating roll 28. Accordingly, the consolidating material 9 may be compressed between the first consolidating roll 27 and the second consolidating roll 28, forming the semisolid material stream 19.

As illustrated in FIG. 5, in some embodiments, the at least one stream support ramp 45 of the material support guide 132 may be disposed beneath the semisolid material stream 19 to support and guide the semisolid material stream 19 as it travels from the consolidating roll unit 18 to the lower head 24. In some embodiments, the stream support ramps 45 may be deployed on both upper and lower sides of the semisolid material stream 19. The stream support ramps 45 may be mounted to the lower head 24 according to the knowledge of those skilled in the art.

As further illustrated in FIG. 5, the lower head 24 of the consolidating head 1 may include a lower head housing 53. An oscillating tamper 55 may be disposed for oscillation in the lower head housing 53 typically as will be hereinafter described. The oscillating tamper 55 may be configured to oscillate vertically at an amplitude which is slightly greater than the thickness of the semisolid material stream 19. The oscillating tamper 55 may be fabricated of materials which enable the oscillating tamper 55 to perform optimally over long periods of operation and in a manner which is unaffected by the heat of the semisolid material stream 19. For example and without limitation, in some embodiments, the material or materials of construction of the oscillating tamper 55 may include a ceramic composite material which is commonly utilized in the machining industry for cutting hard steels.

The lower head housing 53 of the lower head 24 may be mounted in the consolidating head 1 using any structure or technique which is suitable for the purpose. Accordingly, as further illustrated in FIG. 5, in some embodiments, the lower head housing 53 may be supported by the support member 11. The lower end of the support member 11 may be threaded for connection to a union 41 which engages an all thread 42. The lower head housing 53 may threadably engage the all thread 42. This connection arrangement may allow for installation and removal of the lower head 24 without rotation, which may be otherwise be difficult with control and power wiring (not shown) in place. The lower head housing 53 of the lower head 24 may be suitably sized and configured to contain the functional components of the lower head 24.

A variable speed oscillating motor 39 may drivingly engage an output shaft 64 through a flywheel 58. The output shaft 64 may rotate within a pair of shaft bushings 65 and 66, respectively. An oscillating cam 59 may be drivingly engaged for rotation by the output shaft 64. A concentric roller shaft 57 may be rotatably disposed in shaft bushings 56 beneath the output shaft 64. The shaft bushings 56 may be disposed within the oscillating tamper 55. A concentric roller 60 may be provided on the concentric roller shaft 57. The concentric roller 60 may be engaged by the oscillating cam 59. Accordingly, responsive to operation of the oscillating motor 39, the output shaft 64 may rotate the oscillating cam 59. The rotating oscillating cam 59 may roll on the surface of the concentric roller 60, which may force the entire oscillating tamper 55 downwardly, causing oscillation of the oscillating tamper 55 in the lower head housing 53.

An exterior push nut 50 may threadably engage the interior surface of the lower head housing 53 beneath the oscillating tamper 55. A locking nut 51 may secure the exterior push nut 50 in place. An interior push nut 48 may be threadably disposed in the exterior push nut 50. A tamper return spring 52 may be disposed between the exterior push nut 50 and the oscillating tamper 55. Accordingly, the tamper return spring 52 may be configured to push and return the oscillating tamper 55 for the upstroke of each oscillation. The exterior push nut 50 may be threaded within the lower head housing 53 to adjust the spring rate of the tamper return spring 52. In some embodiments, the reciprocating motion of the oscillating tamper 55 may be guided by a bronze bushing 53a disposed in the lower head housing 53. Tamper bushings 67, 67a may be fitted into interior push nut 48 and the exterior push nut 50, respectively. The oscillating tamper 55 may extend through the tamper bushings 67, 67a.

A sealing packing gland 61, suitable for high heat application, may be disposed in the exterior push nut 50. The oscillating tamper 55 may extend through a tamper opening (not illustrated) in the sealing packing gland 61. Accordingly, the sealing packing gland 61 may facilitate the sliding oscillating action of the oscillating tamper 55 and may seal out fine material particles generated by the tamping action. The internal push nut 48 may maintain the correct magnitude of compression on the sealing packing gland 61. A locking nut 49 may secure the interior push nut 48 in place.

The oscillating tamper 55 may be configured to tamp down the heated semisolid material stream 19 as the semisolid material stream 19 is discharged from the consolidating roll 18 and the consolidating head 1 moves in the tamping direction 126, as illustrated in FIG. 3. As it continuously tamps down the heated stream 19, the oscillating tamper 55 may become heated. Accordingly, as further illustrated in FIG. 5, a heat shield 44, which may include copper and/or other heat-absorbing material, may be fit to and supported by the lower head housing 53. An air gap 44b may be disposed between the lower head housing 53 and the heat shield 44. Flexible heat fingers or strands 44a may be cut into or mounted to the bottom of the heat shield 44. The heat strands 44a may be configured to rub against a tamper sleeve 68 which may fit over the outer diameter (OD) of the oscillating tamper 55. The heat strands 44a may be configured to shunt or attract heat away from the oscillating tamper 55 and dissipate the heat into the atmosphere over the large surface area of the heat shield 44.

Reciprocation of the oscillating tamper 55 may occur inside a closed tamper space 54 in the lower head housing 53. Due to the required size of the tamper return spring 52 and the need to minimize the mass of the oscillating tamper 55, the volume of the tamper space 54 may be relatively large in comparison to the diminishment of its volume by oscillation of the oscillating tamper 55. Nevertheless, the oscillating action of the oscillating tamper 55 may slightly compress the air in the tamper space 54. This repeated air compression or pumping action may require air ventilation 43 through the lower head housing 53.

The operating speed of the oscillating motor 39 may be directly related to productivity of the MBC system 200 and can vary with the characteristics of the consolidating material 9. The flywheel 58 may assist in smooth operation of the oscillating cam 59 as oscillation is generated.

As illustrated in FIGS. 1 and 3, the consolidating head 1 may include at least one flux hopper 3. The flux hopper 3 may be suitably configured to contain a supply of a semisolid flux material (not illustrated). Flux tubing 21 may extend downwardly from the flux hopper 3. The flux tubing 21 may be disposed in fluid communication with the flux hopper 3 through a flux valve 6b. At least one flux metering pump 22 may be disposed in fluid communication with the flux tubing 21. As illustrated in FIG. 3, the flux metering pump 22 may discharge forwardly of the oscillating tamper 55 along the tamping direction 126.

As illustrated in FIG. 3, a structural arm 20 may be mounted to the flux hopper 3. As illustrated in FIG. 5, the flux metering pump 22 may be supported by the structural arm 20 such as by a suitable pump connector 46. The pump connector 46 may facilitate selective positional adjustment of the flux metering pump 22. The flux metering pump 22 may be configured to dispense the semifluid flux from the flux hopper 3 into the semisolid material stream 19 to keep the heated semisolid material stream 19 free of metal oxides generated by heating. The segment of the flux tubing 21 which extends from the flux valve 6b may be supported by a suitable tubing support structure (not illustrated), such as by the structural arm 20 which may be mounted to the flux hopper 3.

As further illustrated in FIGS. 3 and 5, at least one stream heater 23 may be mounted to the lower head housing 53 of the lower head 24 such as by a heater connector 47 (FIG. 5) which is suitable for the purpose. The stream heater 23 may be disposed forwardly of the oscillating tamper 55 in the tamping direction 126. The heater connector 47 may facilitate positional adjustment of the stream heater 23 according to the knowledge of those skilled in the art. The stream heater 23 may be configured to heat the semisolid material stream 19 as the semisolid material stream 19 is deposited initially on the receiving base 204 of the working platform 202 (FIG. 1) and then in successive layers to form the manufactured part.

In typical operation of the MBC system 200, the material dispensing hoppers 6a on the consolidating head 1 may contain a supply of the metallurgical powdered consolidating material 9 of one or different types. In some consolidation processes, such as during a forge welding or deposition process, for example and without limitation, more consolidating material 9 may be required than can be stored in one material dispensing hopper 6a. Moreover, in some applications, consolidating materials 9 of different specifications may be required, as will be hereinafter described. As different types of consolidating materials 9 are required for an application, the material dispensing hoppers 6a may be rotated as a unit about the vertical axis of the support member 11 typically by rotation of the tubular shaft 16a, drivingly engaged for rotation by the slewing bearing 16, typically as was heretofore described with respect to FIG. 3. Rotation of the material dispensing hoppers 6a may be terminated when the material dispensing hopper 6a which contains the selected consolidating material 9 is disposed above and in alignment or registration with the underlying feed hopper 7.

With the selected material dispensing hopper 6a in position, the hopper valve 8 may open in response to an appropriate control signal and allow a pre-selected continuous flow of the consolidating material 9 from the material dispensing hopper 6a into the feed hopper 7, with the consolidating material 9 surrounding the hopper auger 10. The released consolidating material 9 may flow into the roll gap 36 (FIG. 4) between the first consolidating roll 27 and the second consolidating roll 28 of the consolidating roll unit 18 under the assistance of the hopper auger 10 (FIG. 3). The first consolidating roll 27 of the consolidating roll unit 18, illustrated in FIG. 4, may be powered by the speed reducer gear unit 26, driven by the roll motor 25. As the consolidating material 9 is forced into the roll gap 36 between the first consolidating roll 27 and the second consolidating roll 28, the second consolidating roll 28 may be driven in a direction opposite to the first consolidating roll 27 by the consolidating pressure of the consolidating material 9.

Consolidation of the consolidating material 9 is known by those skilled in the art as cold forming. The versatility of the MBC system 1 may facilitate application to many different types of powdered consolidating materials 9, with possible differing consolidating requirements. As a result, additional powder preparation such as preheating may be required in some applications.

As a result of the consolidation of the consolidating material 9 in the consolidating roll unit 18, the semisolid material stream 19 may exit the roll gap 36 between the first consolidating roll 27 and the second consolidating roll 28, as illustrated in FIGS. 3 and 5. Operational experience may be used to determine the optimum state of consolidation of the semisolid material stream 19, and this may be adjusted by varying the tension of the housing spring 33 via the adjustment plug 34, as was heretofore described with respect to FIG. 4. There may be some applications in which binders such as wax, soft metal and/or other materials (not illustrated) may need to be added to the consolidating material 9 to assist in the roll consolidating process.

As the semisolid material stream 19 exits the consolidating roll unit 18, the stream support ramp or ramps 45 (FIG. 5) may guide the semisolid material stream 19 to the bottom of the lower head 24, below the oscillating tamper 55. In some embodiments, the stream support ramp or ramps 45 may extend completely up to and surround the oscillating tamper 55, such as in applications in which the consolidating materials 9 have looser consolidation or tend to resist rupture and separation in the tamping process. In some applications, the stream support ramp or ramps 45 may include at least one portion disposed on the opposite or top side of the semisolid material stream 19 for enhanced guide control and to resist lifting of the semisolid material stream 19 with the return cycle of the oscillating tamper 55.

Before it reaches the oscillating tamper 55, the semisolid material stream 19 may be subjected to heating typically via the stream heater 23 and wetting via the semisolid flux discharged from the flux tubing 21 by operation of the flux metering pump 22. Heating of the semisolid material stream 19 may be necessary to facilitate forge welding operations. Forge welding temperatures may vary with the metals used but may be less than half of the melting temperature of the consolidating material 9. The semisolid flux may be discharged from the flux tubing 21 and applied to the semisolid material stream 19 using any type of fine-controlled flux metering pump 22. In some embodiments, the flux metering pump 22 may include a progressive cavity pump. Flow of the flux from the flux hopper 3 through the flux tubing 21 may be controlled manually by actuation of the flux valve 6b (FIG. 3), or by automation.

The substrate 24a (FIG. 3) on the receiving base 204 (FIG. 1) to which the semisolid material stream 19 is to be bonded for initiation of the consolidating manufacturing process may be independently heated. Heating of the substrate 24a may be applied by any conventional heater applicable, including but not limited to laser heating applications.

As the stream support ramp 45 guides the semisolid material stream 19 into the tamp zone 128 of the oscillating tamper 55, forwardly of the oscillating tamper 55 in the tamping direction 126, the robot head 2 may move the lower head 24 in the tamping direction 126, which is opposite the direction in which the semisolid material stream 19 is fed. The oscillating tamper 55 may oscillate vertically to a bottom tip height which is just above the incoming semisolid material stream 19. The oscillating tamper 55 may be synchronized to the feed rate of the semisolid material stream 19 as the oscillating tamper 55 tamps the semisolid material stream 19 in place in a forge welding manner to the substrate 24a or subsequent layer or layers 24b. The working platform 202 and receiving base 204 (FIG. 1) may include any structure having sufficient shape, rigidity, chemical compatibility and heat resistance to restrain movement of the deposition and consolidation process and allow growth of the manufactured part. The portion of the manufactured part which has been forged into place by consolidation of the semisolid material stream 19 is represented by the deposited layers 24b in FIGS. 3 and 5.

The rate of production by the MBC system 200, or the travel speed at which the semisolid material stream 19 can be forged in place, may be controlled by numerous factors including the oscillation rate of the oscillating tamper 55, the size of the oscillating tamper 55, the feed rate of the semisolid material stream 19 (which may be controlled by the roll consolidation rate of the consolidating roll unit 18), and the desired thickness of the semisolid material stream 19. The travel distance of the consolidating head 1 per oscillation may depend upon the size of the oscillating tamper 55, as 100 percent of the surface of the semisolid material stream 19 typically must be tamped.

Throughout tamping of the semisolid material stream 19, the robot head 2 may tilt, raise, lower and rotate the consolidating head 1 to fabricate the geometric shapes and surfaces of the manufactured part within the constraints defined by the hemispherical dimensioned envelope 5 (FIG. 1). Simultaneously, the platform positioning assembly 6 (FIG. 1) may tilt, raise, lower and rotate the working platform 202 and receiving base 204. Accordingly, the combined movement capabilities of the robot head 2 and the platform positioning assembly 6 may facilitate fabrication of a manufactured part having simple and complex geometries which lie within the volume of the hemispherical dimensional envelope 5. Rotation of the robot head 2 may be continuous in either direction about the polar axis of the support member 11.

Utilization of multiple hoppers 6a on the consolidating head 1 may allow for application of more than one powder and/or one or more powder mixtures as the consolidating material 9. At the designated time for changing the consolidating material 9, any consolidating material 9 which continues to fall from the hopper valve 8 of the feed hopper 7 as well as any portion of the semisolid material stream 19 which extends beyond the consolidating roll unit 18 may need to be eliminated or purged. One option for purging may be to program the consumption of this remaining amount of consolidating material 9 into the control system for the MBC system 200. Another option for purging may include dropping the consolidating material 9 outside the hemispherical dimensional envelope 5.

Referring next to FIGS. 6 and 7 of the drawings, in some embodiments of the MBC system 200, the lower head 24 of the consolidating head 1 may include a tamper roll 69 to tamper the semisolid material stream 19. The tamper roll 69 may be appropriate in applications in which the demand for higher production capacity of the MBC system 200 may exhaust the tamping capabilities of the oscillating tamper 55 (FIG. 5). For example and without limitation, the tamper roll 69 may be more appropriate in applications in which the manufactured part is a larger monolithic material. In some embodiments, the tamper roll 69 may be interchangeable with the oscillating tamper 55 in the lower head housing 53. In some embodiments, the tamper roll 69 may be configured to both oscillate and roll against the semisolid material stream 19. The tamper roll 69 may be capable of selective operation in an oscillating mode and a rolling mode depending on which application is more effective for a particular semisolid material stream 19 or for a particular area within the stream 19.

As illustrated in FIG. 7, the tamper roll 69 (FIG. 6) (or the oscillating tamper 55, FIG. 5) may be capable of forming a bonding production pattern of sequential travel paths of three layers, 70, 71, and 72 in a multidirectional, crisscrossing or weaved pattern. These crisscrossed layers 70, 71, 72 may reorient the microstructure and fill in any voids which may otherwise be generated by side-by-side bonding, thereby resulting in a more isotropic and generally crack-resistant manufactured part.

Figure 8:
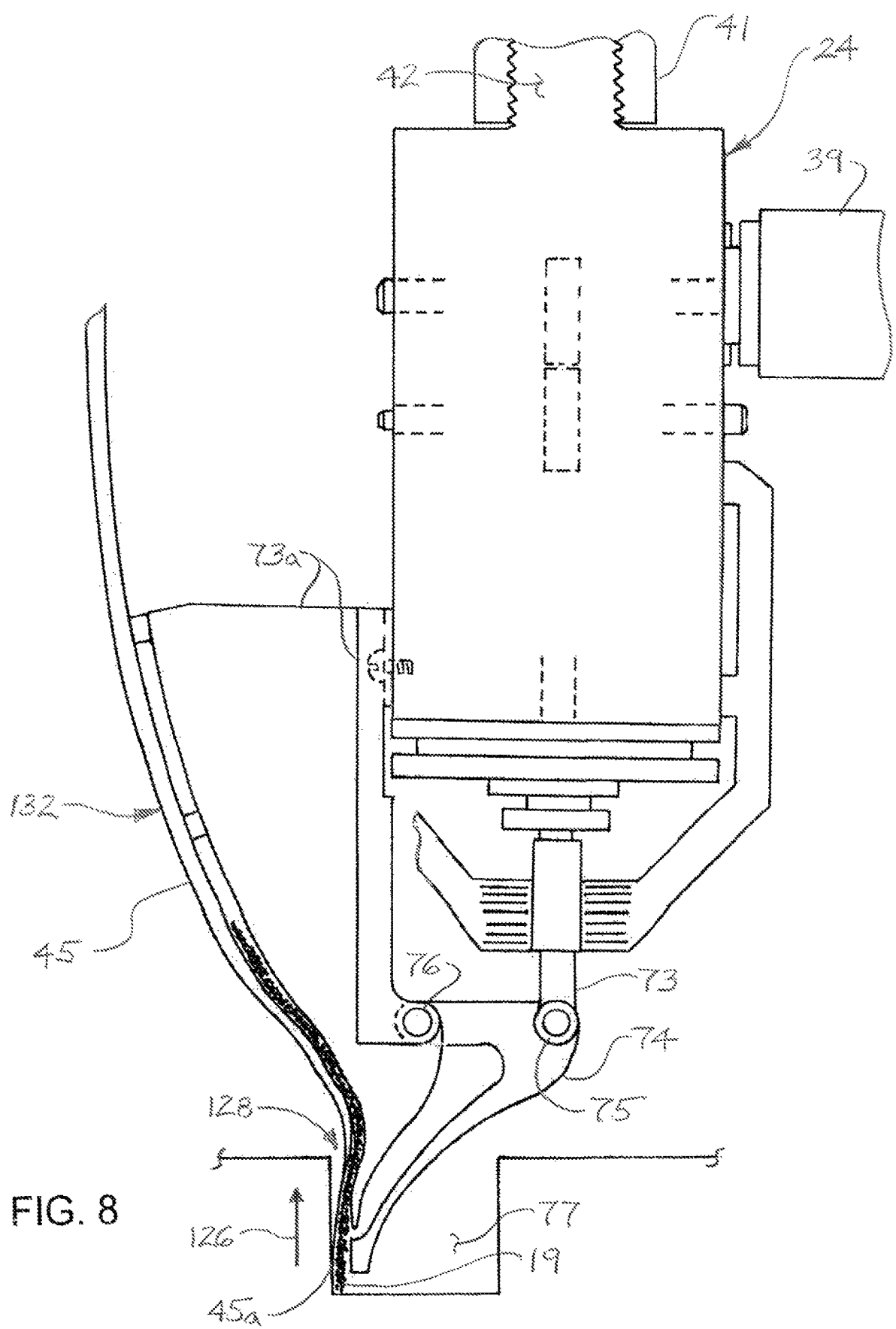
FIG. 8 is another elevation view of the lower head, illustrating a third type of oscillating tamper designed for vertical wall material buildup.

Referring next to FIG. 8 of the drawings, industry categories to which the MBC system 200 may be applicable are numerous and include mining, chemicals, refining, food processing, metal forming and paper making, for example and without limitation. Common to nearly all of these categories are wear and corrosion and the challenges they create. Remedies to these production obstacles may include the use of select materials, claddings, coatings and platings, with varying degrees of success. The MBC system 200 is conceived to address many of these remedies by manufacturing components with the appropriate material in the areas where the material is most needed and by repairing or enhancing existing new or used components. The oscillating tamper 74, interchangeable in the lower head 24, may be designed to bond select material to a vertical wall, such as may be encountered in a well 77 in an existing component such as a plastic injection mold, for example and without limitation. In typical operation, a tamper extension 73 may be connected to the oscillating tamper 74 such as by way of a rotatable pin or shaft 75. The oscillating tamper 74 may be connected to a structure hanger 73a by way of a rotatable shaft 76. The structure hanger 73a may be supported by the lower head 24. As the tamper extension 73 oscillates, the oscillating tamper 74 may rotate about the rotatable shaft 76, horizontally tamping and bonding the semisolid material stream 19 to the vertical wall in the well 77.

Referring next to FIGS. 9-12 of the drawings, another stream bonding method may include an interlocking of stream-to-base mechanically by the joining of irregular surfaces. For example and without limitation, as illustrated in FIGS. 9 and 11, in some embodiments, a consolidating roller 18a may have a textured surface. In the roller tamping operation, the consolidating material 9 may be textured as it is tamped by the textured consolidating roll 18a. The semisolid material stream 19 may be textured on the opposite side during the tamping or roll-in-place operation. As illustrated in FIGS. 10 and 12, a similar effect may be achieved by providing a textured surface on the oscillating tamper 55a.

Referring again to FIGS. 2 and 3 and to FIGS. 13-16 of the drawings, as the consolidating material 9 in the material-dispensing hoppers 6a is depleted throughout operation of the MBC system 200, replenishment of the consolidating material 9 from the storage hoppers 4 may be required. Accordingly, in some embodiments, at least one loading gate 15 may be provided on each material dispensing hopper 6a, and at least one loading gate 15a may be provided on each storage hopper 4 for automated refilling of the material dispensing hoppers 6a. As illustrated in FIG. 13, the loading gate 15 on each material dispensing hopper 6a may include a slidable hopper cover 78 on top of the material dispensing hopper 6a. The hopper cover 78 may be positional between open and closed positions on the material dispensing hopper 6a. A toothed rack gear 82 may be provided on the hopper cover 78. A pinion gear 80, mounted on a pinion gear shaft 198, may mesh with the rack gear 82 on the hopper cover 78.

As illustrated in FIG. 15, a spring 87 may engage the shaft 198 to normally maintain the hopper cover 78 in a closed position on the material dispensing hopper 6a. A push plate 90 may be provided on the material dispensing hopper 6a. A cover flange 96 may be provided on the hopper cover 78 in spaced-apart relationship to the push plate 90.

As further illustrated in FIG. 13, the loading gate 15a on each storage hopper 4 may include a slidable hopper cover 79 which may be provided on the bottom of each storage hopper 4. The hopper cover 79 may be positional between open and closed positions on the storage hopper 4. A toothed rack gear 81 may be provided on the hopper cover 79. A pinion gear 80a, mounted on a pinion gear shaft 199, may mesh with the rack gear 81 on the hopper cover 79. A spring (not illustrated) may engage the pinion gear shaft 199 to normally maintain the hopper cover 79 in a closed position on the storage hopper 4. A push plate 95 may be provided on the storage hopper 4. A cover flange 91 may be provided on the hopper cover 79 in spaced-apart relationship to the push plate 95.

In FIG. 13, the loading gate 15 on a material dispensing hopper 6a is shown in initial contact with the loading gate 15a on a storage hopper 4, typically as implemented by CNC control (not illustrated). After initial contact of the cover flange 96 on the hopper cover 78 with the push plate 95 on the storage hopper 4, the push plate 90 on the material dispensing hopper 6*a* may engage the cover flange 96 on the sliding cover 78. Simultaneously, the push plate 90 on the gate 15 of the material dispensing hopper 6*a* may encounter the cover flange 91 on the sliding cover 79 of the storage hopper 4. The positions and mountings of the hopper covers 78 and 79 are illustrated in FIGS. 14 and 16 as the automated robot head 2 (FIG. 1) positions the gate 15 on the material dispensing hopper 6*a* under the storage hopper 4 for reloading with the hopper covers 78 and 79 open. The material dispensing hopper 6*a* may be larger than the storage hopper 4 and may always be so positioned and operated as to have an opening under the storage hopper 4 for spillage control. In the half-section views of FIGS. 14 and 16, the hopper covers 78 and 79 extend outwardly from the material dispensing hopper 6*a* and the storage hopper 4 respectively. In their extended positions, the hopper covers 78 and 79 may be supported by the respective rack gears 82 and 81 as well as two packing seal glands 89 and 88, respectively. As illustrated in FIGS. 14 and 16, in the case of the gate 15, a bent plate 194 may support the seal gland 89. In the gate 15*a*, a bent plate 92 may house the seal gland 88. A bent plate 93 may provide a support and sliding surface for the hopper cover 79.

As the robot head 2 (FIG. 1) opens the gates 15, 15*a*, the coil springs 87 may become wound tight. As the robot head 2 decouples the gates 15, 15*a* and they close, the hopper covers 78 and 79 may be closed by the action of the wound coil springs 87 recoiling and returning to their original state, thereby sealing the respective material dispensing hopper 6*a* and storage hopper 4 from further flow and spillage.

Figure 17:
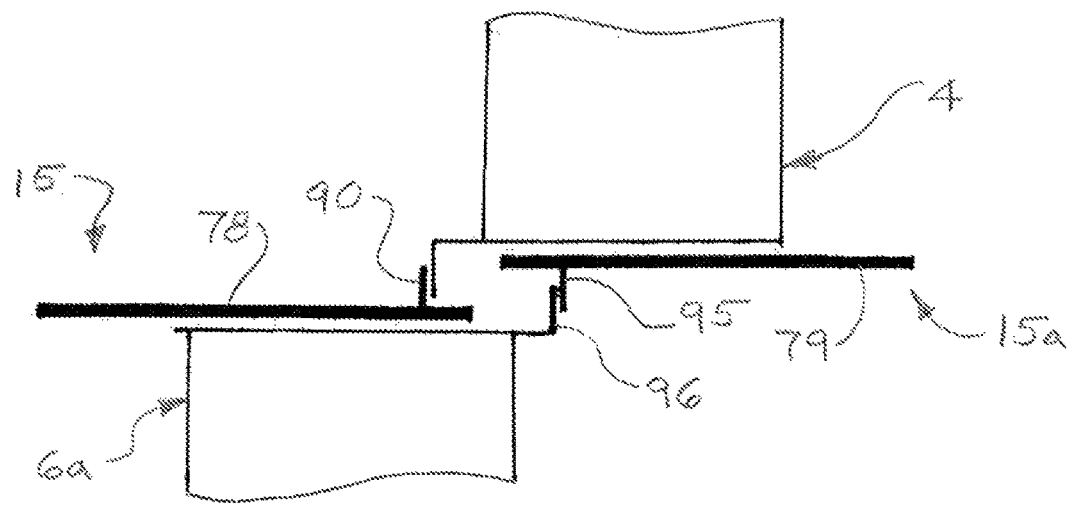
FIG. 17 is a side elevation schematic view of the loading gates of FIG. 13 as opening of the gates is initiated.
Figure 18:
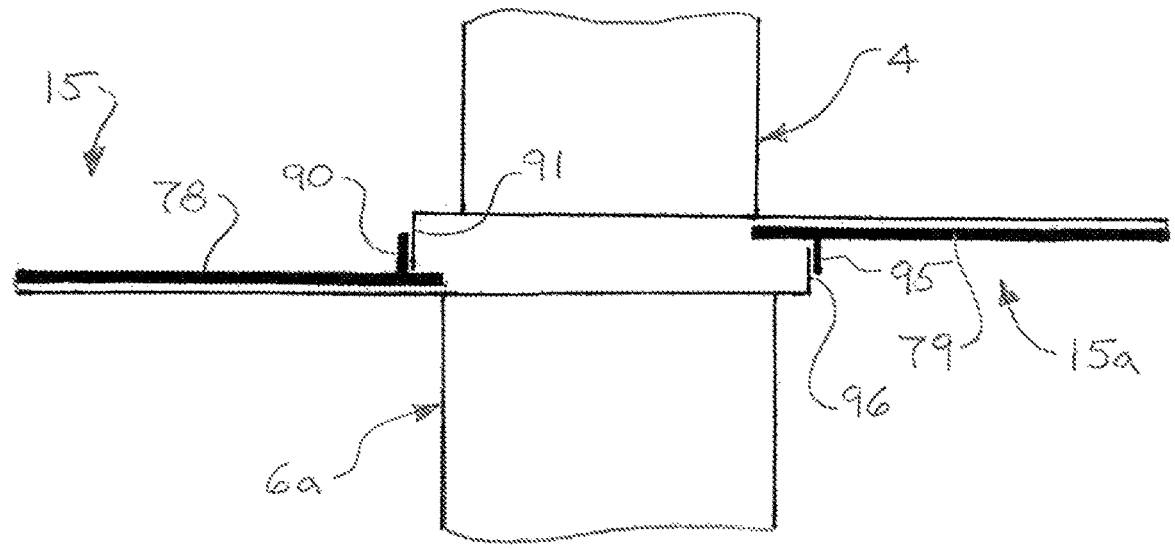
FIG. 18 is a side elevation schematic view of the loading gates of FIG. 13 in the open position.

Action of the sliding hopper covers 78 and 79 is illustrated schematically in FIGS. 17 and 18.

In some industries, there are applications of mechanical components in which significant weight reduction can be advantageous. One such application is the valve train engine components of a racing engine. Accordingly, referring next to FIGS. 19-22, a typical reduced weight single lobe camshaft 124 fabricated using the MBC system 200 is illustrated. FIG. 20 illustrates a longitudinal sectional view of the camshaft 124 illustrated in FIG. 19. As illustrated in FIG. 20, the single lobe camshaft 124 may include a lobe body 91*a* which may be fabricated of a titanium alloy such as 6Al4V. The lobe body 91*a* may be fabricated by subtractive machining, casting, forging, 3D printing or consolidation using the MBC system 200. As illustrated in FIG. 22, as it turns in a set of rolls or in a lathe, the roll oscillating tamper roll 69 may roll a base layer 92*a* of semi-consolidated high strength steel to the surface of the typically titanium alloy of the lobe body 91*a*, thereby bonding the base layer 92*a* through a transitional gradient of titanium and steel, such as described in U.S. Pat. No. 9,700,957 B1, which patent is hereby incorporated by reference herein in its entirety. The steel base layer 92*a* may serve to strengthen and stiffen the lobe body 91*a* of the camshaft 124, which may be necessary due to the lower modulus of elasticity of titanium. An outer layer 93*a* of very hard steel or a tungsten carbide-nickel alloy may in like manner be roll-bonded on the steel base layer 92*a*, for maximum wear resistance and may be subjected to post heat treatment. FIG. 21 illustrates the manner in which the roll oscillating tamper 94*a* of the MBC system 200 may be applied against an interior corner of the base layer 92*a* to bond the semisolid material stream 19 to the outer surface of the titanium lobe body 91*a*. Objectives of this simplified example would be to save significant weight, produce a much tougher cam than can be achieved using the conventional fabrication method and generate a highly wear-resistant surface on the camshaft 124.

Use of titanium alloys versus steel in numerous industrial and defense applications may offer an attractive reduction in weight as well as better corrosion resistance. Alloyed titanium also has impressive strength properties. However, the modulus of elasticity of titanium is approximately half that of steel, thereby greatly limiting its use for many component applications. Additionally, titanium offers little wear and abrasion resistance. In U.S. Pat. No. 9,700,957, these limitations are addressed using methods to stiffen and surface clad titanium alloys for proliferate use. There are many similar examples with other metals and materials throughout industry in which this type of internal stiffening or strengthening could be useful.

As illustrated in FIG. 22, in some applications, a shaft or roll 96*a* may undergo a resurfacing procedure using the MBC system 200. Accordingly, a resurfacing material 97*a* may be applied to the shaft or roll 96*a* to render the shaft or roll 96*a* wear-resistant, corrosion-resistant, or both. In this case, the shaft or roll 96*a* may be centered in a lathe (not shown), and the MBC system 200 may be mounted on a carriage (not illustrated). As the shaft or roll 96*a* turns at a designated speed, the oscillating tamper roller 69 of the MBC system 200 may bond select powder or semi-consolidated powder in the semisolid material stream 19 to the surface of the shaft or roll 96*a* typically with the assistance of the heater 23 and the stream support ramp 45 (FIG. 5). In some applications, an additional support roll 95*a* may impart support to the shaft or roll 96*a* during tamping.

Referring next to FIGS. 23-29 of the drawings, in some applications of the MBC system 200, a typical industrial component may include the hub 98 of an aerospace component, as illustrated in FIG. 28. The hub 98 may be fabricated of a titanium alloy, for example and without limitation. Hub members 99 may include internal stiffening members which may be fabricated of steel, for example and without limitation. The hub members 99 may be disposed within a solid hub body 98*a* which may include titanium alloy in some embodiments. The hub members 99 may be oriented such as to inhibit excessive deflection of the hub 98 as the hub 98 is subjected to heavy stress. As illustrated in FIGS. 23 and 24, in some applications, the hub members 99 may include structural truss members 99*a* and 99*b*, as will be hereinafter described.

The sectional view of FIG. 23, taken along section lines J-J in FIG. 28, illustrates structural truss members 99*a*, 99*b* embedded in and surrounded by the typically titanium alloy hub body 98*a*. In FIG. 24, the structural truss members 99*a*, 99*b* of FIG. 23 are illustrated in an unfinished stage of fabrication. The process of production of the hub 98 by the MBC system 200 may be initiated by tamping in place a bottom horizontal layer 99*g* on the receiving base 204 (FIG. 1) of the MBC system 200 and then successively tamping layers on the bottom horizontal layer 99*g* until the location for initiating a bottom structural truss member 99*f* is reached. Transition from the typically titanium bottom horizontal layer 99*g* to the typically steel bottom structural truss member 99*f* may be carried out by initially tamping a gradient between these two metals using particles of the metals. A third metal, typically vanadium, may coat at least some of the metal particles, such as is described in U.S. Pat. No. 9,700,957. The gradient may include a gradual transition of one metal to the next metal in the gradient. This gradient transition may prevent what would otherwise be an abrupt microstructural change in chemistry and morphology at the juncture of the two dissimilar metals. This abruptness in microstructural change may otherwise render the resulting fabricated component susceptible to fatigue fracture. The gradient may be generated by blending the metal powders in gradually decreasing weight or volume percentages of the first metal and increasing the weight or volume percentages of the next metal in the gradient. By the successive tamping of thin layers of powder by operation of the MBC system 200, the gradient may be fabricated in a layer-by-layer process.

Throughout tamping of the gradient layer, the consolidating material 9 of each metal may be dispensed from its corresponding material dispensing hopper 6a (FIG. 3) on the consolidating head 1 of the MBC system 200. Accordingly, as one tamped layer is completed, the first material dispensing hopper 6a may be rotated away from the underlying feed hopper 7 and another material dispensing hopper 6a (FIG. 3) which contains the consolidating material 9 corresponding to the next metal or mixture of metals in the gradient may be rotated into place. The consolidating material 9 may be dispensed from that material dispensing hopper 6a through the feed hopper 7 and tamped into place. Alternatively, in some applications, component production may utilize multiple MBC systems 200 which may be operated in choreographed sequence to perform independent tasks in formation of the component part.

The gradient or layered transition of metals in fabrication of the hub 98 or other component part is illustrated in FIGS. 25 and 27. FIG. 25 represents sectional view 25-25 of a structural truss member 99b in FIG. 24. FIG. 27 represents sectional view 27-27 of a structural truss member 99a in FIG. 23. As illustrated in FIG. 25, the structural truss member 99b may be concentrically surrounded by an inner gradient layer 99c, a middle gradient layer 99d and an outer gradient layer 99e. The outer gradient layer 99e may be surrounded by the typically titanium alloy hub body 98a. In FIG. 25, the inner gradient layer 99c may initially be tamped onto the structural truss member 99b by operation of the MBC system 200. Since the structural truss member 99b may be made of steel, the inner gradient layer 99c, middle gradient layer 99d and outer gradient layer 99e may each have a 33.3% volumetric proportional change of one metal to the other, in this case, steel to titanium. Therefore, the inner gradient layer 99c may include 75% steel and 25% titanium, whereas the middle gradient layer 99d may include 50% steel and 50% titanium and the outer gradient layer 99e may include 25% steel and 75% titanium. In each gradient layer, these percentages may vary depending on the application. The MBC system 200 or a group or combination of the MBC systems 200 may be operated to successively tamp different metals in thin, stepped layers until all metal is tamped in place to form the hub 98 having the configuration illustrated in FIGS. 23 and 28.

As illustrated in FIG. 27, the structural truss member 99a may be concentrically surrounded by an inner gradient layer 99g, a middle gradient layer 99h and an outer gradient layer 99j. The outer gradient layer 99j may be surrounded by the hub body 98a. The inner gradient layer 99g, middle gradient layer 99h and outer gradient layer 99j may have the same proportional compositions of steel and titanium as the inner gradient layer 99c, middle gradient layer 99d and outer gradient layer 99e of the structural truss member 99b in FIG. 25.

The layering geometry of gradient layers in fabrication of the hub 98 is further illustrated in FIG. 26. A stepped, layered stackup 100a could represent a segment of a hub member 99 of the hub 98. The stackup 100a may include stacked layer segments 101-103 which represent successive material gradient layers tamped in place to form the hub member 99. A closer detail is illustrated in FIG. 29, in which the oscillating tamper 55 is tilted for ease of packing the powdered consolidating material 9 into a corner between the previously deposited layer and the nascent layer, after which the oscillating tamper 55 may return to vertical to finish the layer.

The layering steps in the various illustrations are shown in thickness exaggeration for clarity while in production they may be only 10 to 20 thousandths of an inch thick. This thin layering, and the blending of adjacent metal by forging of every layer, may render any offset microstructure insignificant.

Figure 30:
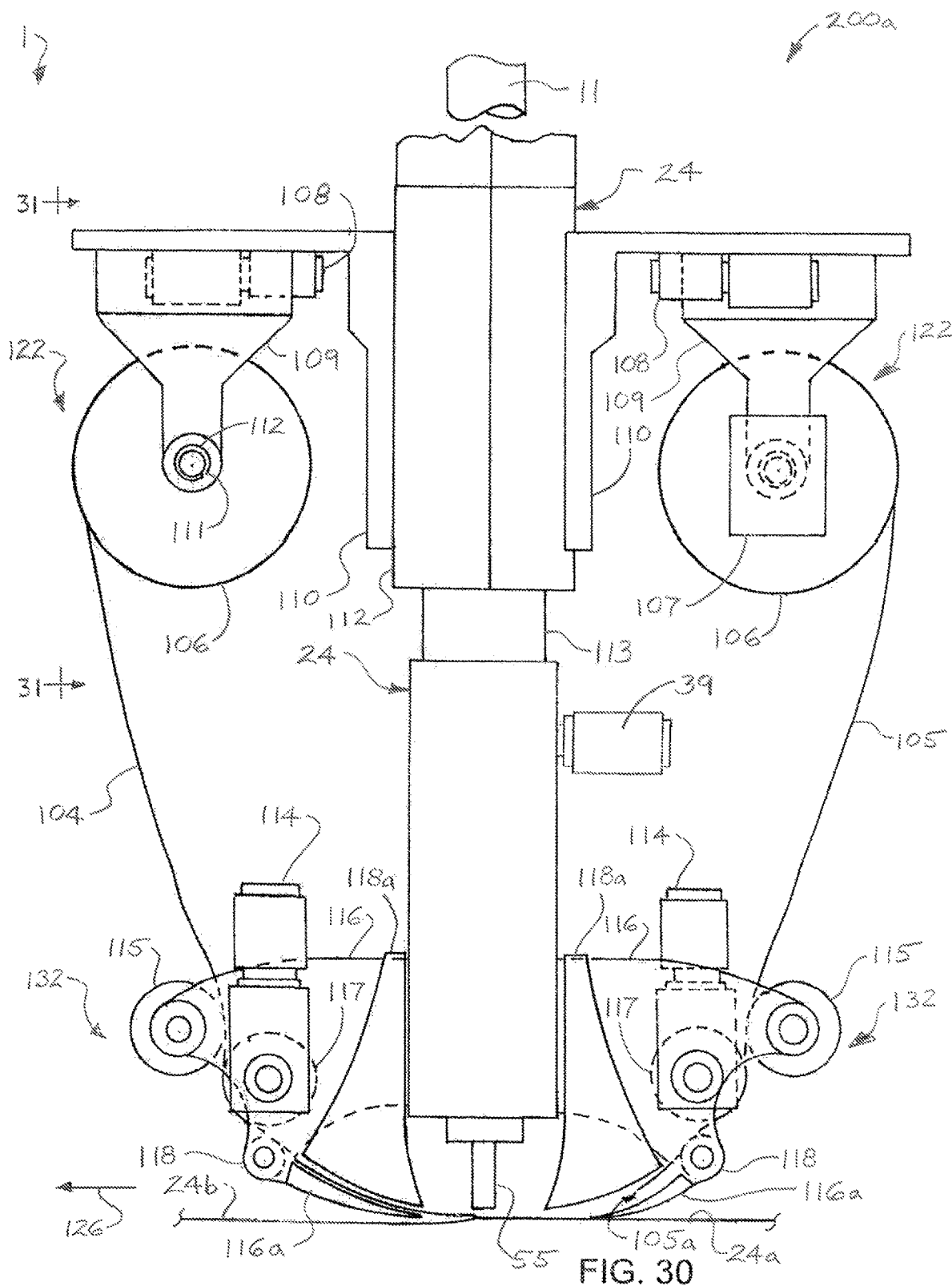
FIG. 30 represents an alternative method of tamping the semisolid material stream in place by feed of a wire, rod or sheet to the oscillating tamper, with coil drums utilized as storage for the wound wire, rod or sheet.

Referring next to FIG. 30 of the drawings, another interchangeability feature of an MBC system 200a is illustrated. In some applications, the workplace or component which is being fabricated may require large, complex-shaped, monolithic material components. For example and without limitation, instead of tamping a semisolid material stream 19, as was heretofore described, a fully dense filament, wire, or strip 104, 105 may be tamped layer-by-layer into the finished component.

The consolidating head 1 of the MBC system 200a may include at least one material dispensing assembly 122. The material dispensing assembly 122 may include at least one reel drum 106. By the quick release and removal of the material dispensing hoppers 6a and consolidation rolls 18 (FIG. 3) from the consolidating head 1, and the sliding in place of a polygon-shaped support member sleeve 112 over the support member 11 (FIG. 3), one or more reel drums 106, which may be fitted with quick connect supports 110 mounted to the support member sleeve 11, may be interchanged to the MBC system 200. The reel drums 106 may be supported, typically via a corresponding drum shaft 111, to an overhead structure (not illustrated) by hanger structures 109 which may be mounted to a horizontal turntable bearing and drive unit 108. The hanger structures 109 may be equipped with the support member sleeve 112 or frictionless bearings (not illustrated). Stub shafts or a continuous shaft through and concentric with the center of each drum 106 may be included for drum rotation. A filament, wire, strip or sheet, hereinafter strip 104, 105, may be wound around each drum 106 in a multi-layered manner and fed to the oscillating tamper 55 typically through at least one material support guide 132. In some embodiments, each material support guide 132 may include at least one snubbing roll 115, 117, 118. The snubbing rolls 115, 117, 118 may guide and control passage of the strip 104, 105 from each reel drum 106 to the oscillating tamper 55. The snubbing rolls 115, 117, 118 may be mounted to a support structure 116 which may, in turn, be removably mounted to the lower head 24 of the consolidating head 1. A smooth-surfaced support guide 118a may be mounted on the support structure 116 to guide the strip 104, 105 to the oscillating tamper 55.

As further illustrated in FIG. 30, each snubbing roll 117 may be driven by a gear motor 114 which provides the power to pull the strip 104, 105 from the corresponding drum 106. A holding, restraining, or braking system 107, which may be conventional, may be mounted on one end of the drum shaft 111 of each drum 106. The braking system 107 may be magnetic or mechanical and may maintain a constant pre-determined tension on the strip 104, 105 typically by applying resistance to the drum shaft 111.

The control system for the MBC system 200 may include speed matching and synchronizing for all drives to match travel, material feed and tamping or roll rates. These control features are not illustrated herein and are well-known by those skilled in the art.

In order for the tamping option for the strip 104, 105 to be at call for operation when only one is in use at a time, the strip 104, 105 may be positioned and held as shown by 105*a* in FIG. 30. The strip 104 may be directed to the oscillating tamper 55 by a pair of support guides 116*a*, 118*a*. In applications in which a more fragile strip 104, 105 is used in the tamping process, the support guides 116*a*, 118*a* may extend up to or completely surround the oscillating tamper 55.

Figure 31:
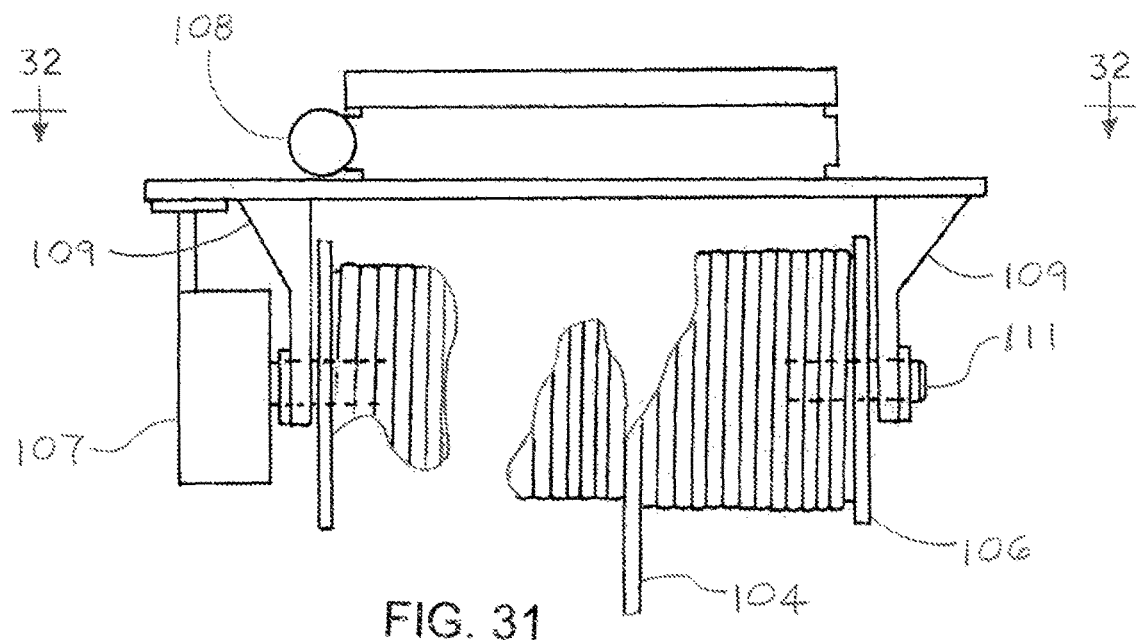
FIG. 31 is an elevation view, taken along viewing lines 31-31 in FIG. 30, of the coil-off side of a coil drum illustrated in FIG. 30.
Figure 32:
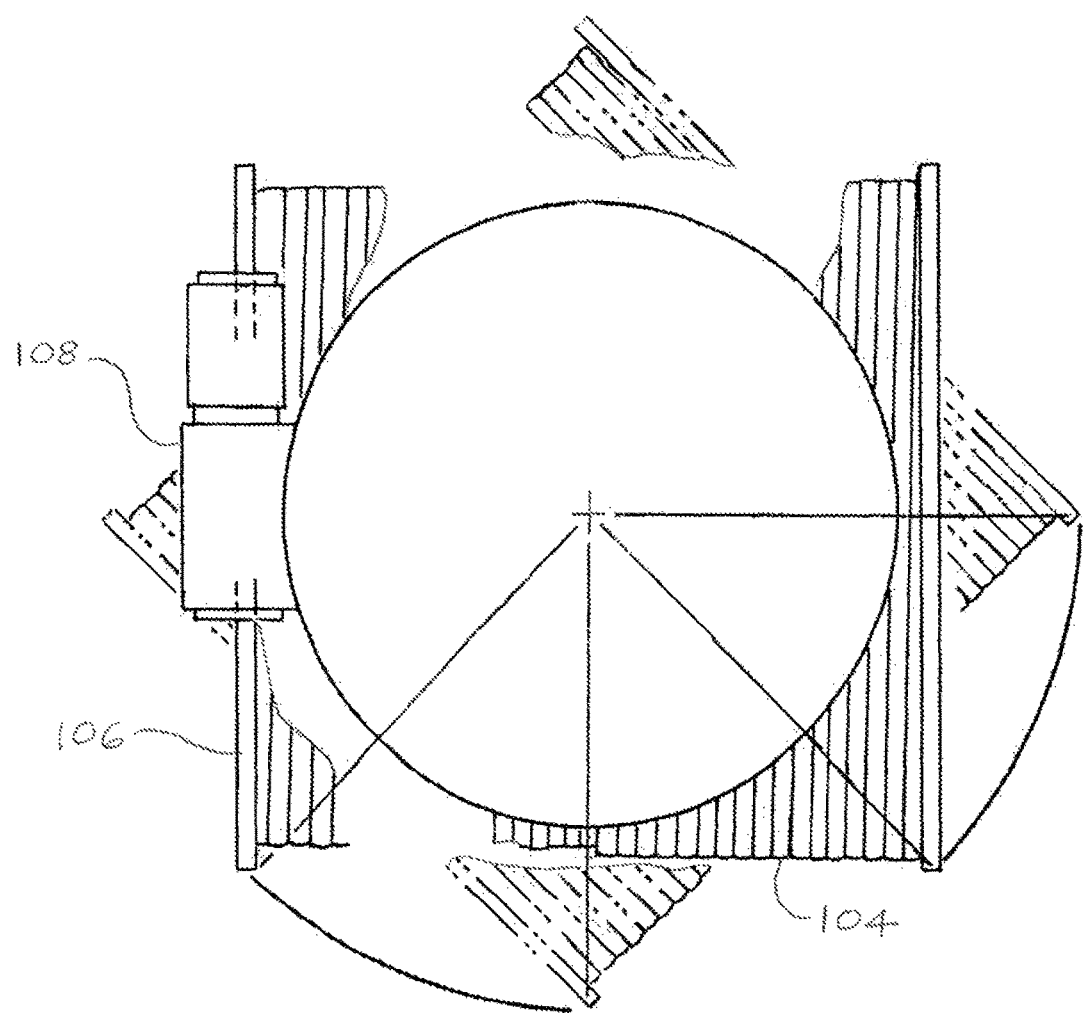
FIG. 32 is a plan sectional view, taken along section lines 32-32 in FIG. 31, of the coil drum, illustrating oscillation of the coil drum, back and forth concurrent to the material coil-off of the coil drum, in order to minimize the fleet angle formed between the coil-off strip and the snubbing rolls in the lower head.

In FIG. 31, each drum 106, taken along section lines E-E in FIG. 30, is illustrated in front elevation front view. In FIG. 32, each drum 106, taken along viewing lines F-F in FIG. 32, is illustrated in plan view. As it pays off from the drum 106, the strip 104, 105 moves below the snubbing roll 115 (FIG. 30). As the strip 104, 105 peels off from the coil of the drum 106, the point of payout may change across the face of the drum 106. The extreme point of payout is at the end of the drum face of the drum 106. From this point, the angle formed by the line of the filament, wire, or strip 105, 105 and the snubbing roll 115 may cause difficulty by flexing the strip 104, 105 and compromising alignment. Therefore, the turntable bearing and drive unit 108 may continuously rotate the drum 106 in a back-and-forth motion to maintain the point of payout of the strip 104, 105 in alignment with the snubbing roll 115. This back-and-forth movement may result in an insignificant twist in the strip 104, 105 during payout.

The illustrative embodiments of the MBC 200 as described and illustrated herein focus on the art of forge-welding for bonding an incoming stream of consolidating material 9, typically having heated powdered or particulate metal, to a receiving, heated substrate 24*a* (FIG. 3). Other materials and/or bonding methods may be applicable to operation of the MBC system 200. It will be recognized and understood by those skilled in the art that any material or combination of materials in addition to or instead of metal and which displays characteristics of flexibility, reasonable aggregate strength and compactability to some degree (in the case of powders) may be applicable to the layering process, with slight equipment alterations in some cases. Applicable materials may include but are not limited to sand, ceramic powders, glass powders, plastic powders or filaments, wood particles, natural earth materials, paper particles and combinations thereof. For at least some of these materials, various types and viscosities of adhesives may be used to bind particles together ahead of the tamping action. Adhesives may be stored in and fed from the flux hopper 3 (FIG. 3). Adhesives may be heat activated to ensure that solidification occurs only after discharge from the flux tubing 21. Valves controlled by a CNC or other control system (not illustrated) may ensure synchronization with travel and disposition of the MBC system 200.

As forge welding is an elevated temperature procedure, there may be applications which allow generation of undesirable oxides. In such applications, the MBC process may be performed in a controlled atmospheric environment according to the knowledge of those skilled in the art.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A manufacturing by consolidation system suitable for fabricating a component, comprising:
   a consolidating head movable in a tamping direction, the consolidating head including:
      at least one support member;
      a tamping head carried by the at least one support member, the tamping head having at least one tamper;
      at least one material dispensing assembly carried by the at least one support member, the at least one material dispensing assembly configured to contain or support a supply of at least one consolidating material;
      a consolidating roll unit disposed in material-receiving relationship to the at least one material dispensing assembly, the consolidating roll unit having a plurality of consolidating rolls;
      at least one material support guide carried by the tamping head in material-receiving relationship to the consolidating roll unit;
      at least one flux hopper configured to contain a supply of a semisolid flux material; and
      at least one flux metering pump disposed in fluid communication with the at least one flux hopper, the at least one flux metering pump discharging forwardly of the tamper along the tamping direction;
   a platform positioning assembly disposed beneath the consolidating head; and
   a working platform carried by the platform positioning assembly.

2. The manufacturing by consolidation system of claim 1 wherein the tamper comprises an oscillating tamper.

3. The manufacturing by consolidation system of claim 1 wherein the tamper comprises a tamper roll.

4. The manufacturing by consolidation system of claim 1 wherein the at least one material dispensing assembly comprises at least one material dispensing hopper and the at least one consolidating material is a particulate consolidating material.

5. The manufacturing by consolidation system of claim 4 wherein the at least one material dispensing hopper comprises a plurality of material dispensing hoppers.

6. The manufacturing by consolidation system of claim 1 wherein the at least one material support guide comprises at least one stream support ramp having a guide discharge end forwardly of the tamper along the tamping direction.

7. The manufacturing by consolidation system of claim 1 wherein the consolidating roll unit comprises a feed hopper disposed in material-receiving relationship to the at least one material dispensing assembly, and the plurality of consolidating rolls is disposed in material-receiving relationship to the feed hopper.

8. The manufacturing by consolidation system of claim 1, wherein the consolidating roll unit includes a roll motor and a speed reducer gear unit drivingly engaged by the roll motor, and the plurality of consolidating rolls is drivingly engaged for rotation by the speed reducer ear unit.

9. A manufacturing by consolidation system suitable for fabricating a component, comprising:
   a consolidating head movable in a tamping direction, the consolidating head including:
      at least one support member;
      a tamping head carried by the at least one support member, the tamping head having at least one tamper;
      at least one material dispensing hopper carried by the at least one support member, the at least one material dispensing hopper configured to contain a supply of at least one consolidating material;

a feed hopper disposable in material-receiving relationship to the at least one material dispensing hopper, a consolidating roll unit disposed in material-receiving relationship to the feed hopper, the consolidating roll unit having a plurality of consolidating rolls;

at least one stream support guide carried by the tamping head in material-receiving relationship to the consolidating roll unit, the at least one stream support guide having a guide discharge end forwardly of the tamper along the tamping direction;

at least one flux hopper configured to contain a supply of a semisolid flux material; and at least one flux metering pump disposed in fluid communication with the at least one flux hopper, the at least one flux metering pump discharging forwardly of the tamper along the tamping direction;

a platform positioning assembly disposed beneath the consolidating head; and a working platform carried by the platform positioning assembly, the platform positioning assembly configured to impart multi-positional capability to the working platform.

10. The manufacturing by consolidation system of claim 9 further comprising at least one stream heater carried by the at least one support member and disposed forwardly of the tamper in the tamping direction.

11. The manufacturing by consolidation system of claim 9 wherein the at least one material dispensing hopper comprises a plurality of material dispensing hoppers.

12. The manufacturing by consolidation system of claim 11 wherein the plurality of material dispensing hoppers is rotatable about the at least one support member.

13. The manufacturing by consolidation system of claim 9 wherein the consolidating roll unit includes a roll motor and a speed reducer gear unit drivingly engaged by the roll motor, and wherein the first consolidating roll and the second consolidating roll are drivingly engaged for rotation by the speed reducer gear unit.

14. The manufacture by consolidation system of claim 13 further comprising a first consolidating roll housing and a second consolidation roll housing, and wherein the first consolidating roll and the second consolidating roll are disposed in the first consolidating roll housing and the second consolidating roll housing, respectively.

15. The manufacture by consolidation system of claim 14 further comprising at least one housing joint disposed between the first consolidating roll housing and the second consolidating roll housing, the at least one housing joint enabling sliding of the first consolidating roll housing and the second consolidating roll housing with respect to each other, and at least one housing spring configured to clamp the first consolidating roll housing against the second consolidating roll housing.

16. The manufacture by consolidation system of claim 9 wherein the tamper is an oscillating tamper or a tamper roll.

17. A manufacturing by consolidation system suitable for fabricating a component, comprising:

a consolidating head movable in a tamping direction, the consolidating head including:

at least one support member;

a tamping head carried by the at least one support member, the tamping head having at least one tamper;

at least one horizontal turntable bearing and drive unit carried by the tamping head;

at least one reel drum carried and drivingly engaged by the at least one horizontal turntable bearing and drive unit, the at least one reel drum configured to contain or support at least one consolidating material including at least one filament, wire, strip, or sheet wound on the at least one reel drum;

at least one snubbing roll carried by the tamping head in material-receiving relationship to the at least one reel drum; and at least one gear motor drivingly engaging the at least one snubbing roll for rotation;

a platform positioning assembly disposed beneath the consolidating head; and a working platform carried by the platform positioning assembly.

18. The manufacturing by consolidation system of claim 17 wherein the tamper comprises an oscillating tamper.

19. The manufacturing by consolidation system of claim 17 wherein the tamper comprises a tamper roll.

20. The manufacture by consolidation system of claim 17 further comprising a support member sleeve disposed over the at least one support member and at least one quick connect support carried by the support member sleeve, and wherein the at least one horizontal turntable bearing and drive unit is carried by the at least one quick connect support.

* * * * *